US010717231B2

(12) United States Patent
Katakura et al.

(10) Patent No.: US 10,717,231 B2
(45) Date of Patent: Jul. 21, 2020

(54) THREE-DIMENSIONAL FORMING APPARATUS AND THREE-DIMENSIONAL FORMING METHOD

(71) Applicant: SEIKO EPSON CORPORATION, Tokyo (JP)

(72) Inventors: Takahiro Katakura, Okaya (JP); Takeshi Miyashita, Suwa (JP); Tomoyuki Kamakura, Matsumoto (JP); Tetsuhiko Takeuchi, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 551 days.

(21) Appl. No.: 15/163,287

(22) Filed: May 24, 2016

(65) Prior Publication Data

US 2016/0347001 A1    Dec. 1, 2016

(30) Foreign Application Priority Data

May 26, 2015    (JP) ................................ 2015-106177

(51) Int. Cl.
| | | |
|---|---|---|
| B29C 67/00 | (2017.01) | |
| B22F 3/105 | (2006.01) | |
| B33Y 10/00 | (2015.01) | |
| B29C 64/165 | (2017.01) | |
| B33Y 30/00 | (2015.01) | |

(52) U.S. Cl.
CPC .......... *B29C 64/165* (2017.08); *B22F 3/1055* (2013.01); *B22F 2003/1056* (2013.01); *B33Y 10/00* (2014.12); *B33Y 30/00* (2014.12); *Y02P 10/295* (2015.11)

(58) Field of Classification Search
CPC ...... B22F 3/1055; B33Y 10/00; B23K 26/144
See application file for complete search history.

(56) References Cited

U.S. PATENT DOCUMENTS

| | | | |
|---|---|---|---|
| 6,259,962 B1 | 7/2001 | Gothait | |
| 9,415,443 B2 * | 8/2016 | Ljungblad | ............. B22F 3/1055 |
| 9,468,973 B2 * | 10/2016 | Ljungblad | ............. B22F 3/1035 |
| 2004/0226929 A1 | 11/2004 | Miura et al. | |
| 2006/0266740 A1 | 11/2006 | Sato et al. | |
| 2007/0052787 A1 | 3/2007 | Miura et al. | |

(Continued)

FOREIGN PATENT DOCUMENTS

| | | |
|---|---|---|
| EP | 1452326 A | 9/2004 |
| JP | 4-050381 B | 8/1992 |

(Continued)

OTHER PUBLICATIONS

European Search Report for Application No. 16171369.8 dated Oct. 28, 2016.

*Primary Examiner* — Dana Ross
*Assistant Examiner* — Lawrence H Samuels
(74) *Attorney, Agent, or Firm* — Workman Nydegger

(57) ABSTRACT

A three-dimensional forming apparatus includes: a stage; a material supply unit that supplies the stage with a sintered material including metal powder and a binder; a head unit that includes an energy radiation unit supplying energy capable of sintering the sintered material to the sintered material supplied by the material supply unit; a head base that holds a plurality of the head units; and a driving unit that is capable of three-dimensionally moving the head base relative to the stage.

6 Claims, 21 Drawing Sheets

(56) References Cited

U.S. PATENT DOCUMENTS

| | | | |
|---|---|---|---|
| 2014/0099476 A1* | 4/2014 | Subramanian | B22F 5/009 428/164 |
| 2014/0186549 A1 | 7/2014 | Miyagi et al. | |
| 2014/0246809 A1* | 9/2014 | Hofmann | B29C 64/20 264/308 |
| 2014/0348691 A1* | 11/2014 | Ljungblad | B22F 3/1055 419/53 |
| 2015/0004045 A1* | 1/2015 | Ljungblad | B22F 3/1035 419/47 |
| 2015/0104346 A1* | 4/2015 | Nakamura | C22C 1/0433 419/55 |
| 2016/0221261 A1 | 8/2016 | Yamamoto et al. | |
| 2017/0304894 A1 | 10/2017 | Buller | |

FOREIGN PATENT DOCUMENTS

| | | |
|---|---|---|
| JP | 2000-144205 A | 5/2000 |
| JP | 2005-219060 A | 8/2005 |
| JP | 2008-184622 A | 8/2008 |
| JP | 2013-075308 A | 4/2013 |
| JP | 2013-247181 A | 12/2013 |
| JP | 2014-097658 A | 5/2014 |
| WO | 03-034314 | 4/2003 |
| WO | 2014-107204 | 7/2014 |
| WO | 2014199134 A | 12/2014 |
| WO | 2015-049834 | 4/2015 |
| WO | 2016077250 A1 | 5/2016 |

\* cited by examiner

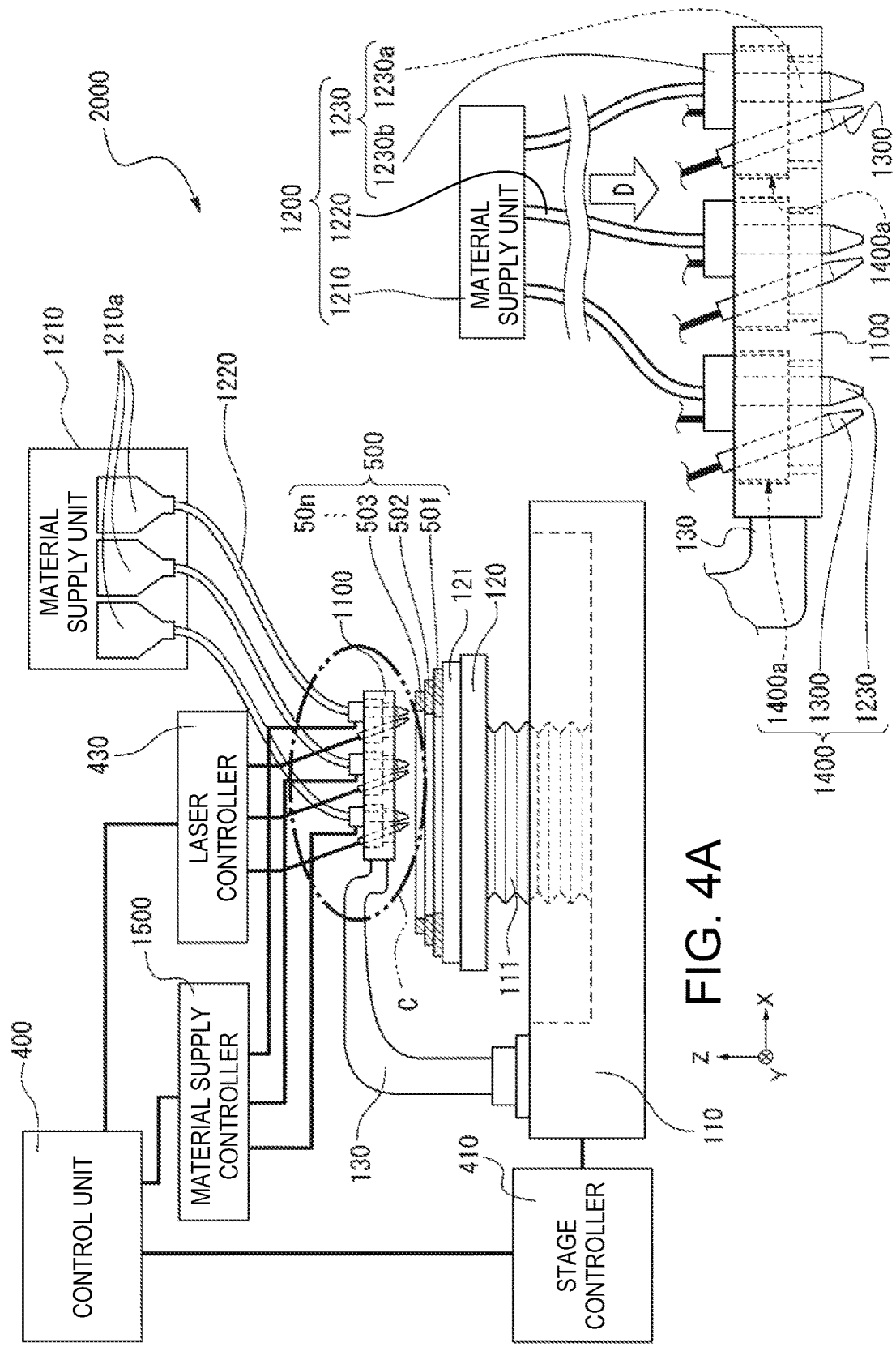

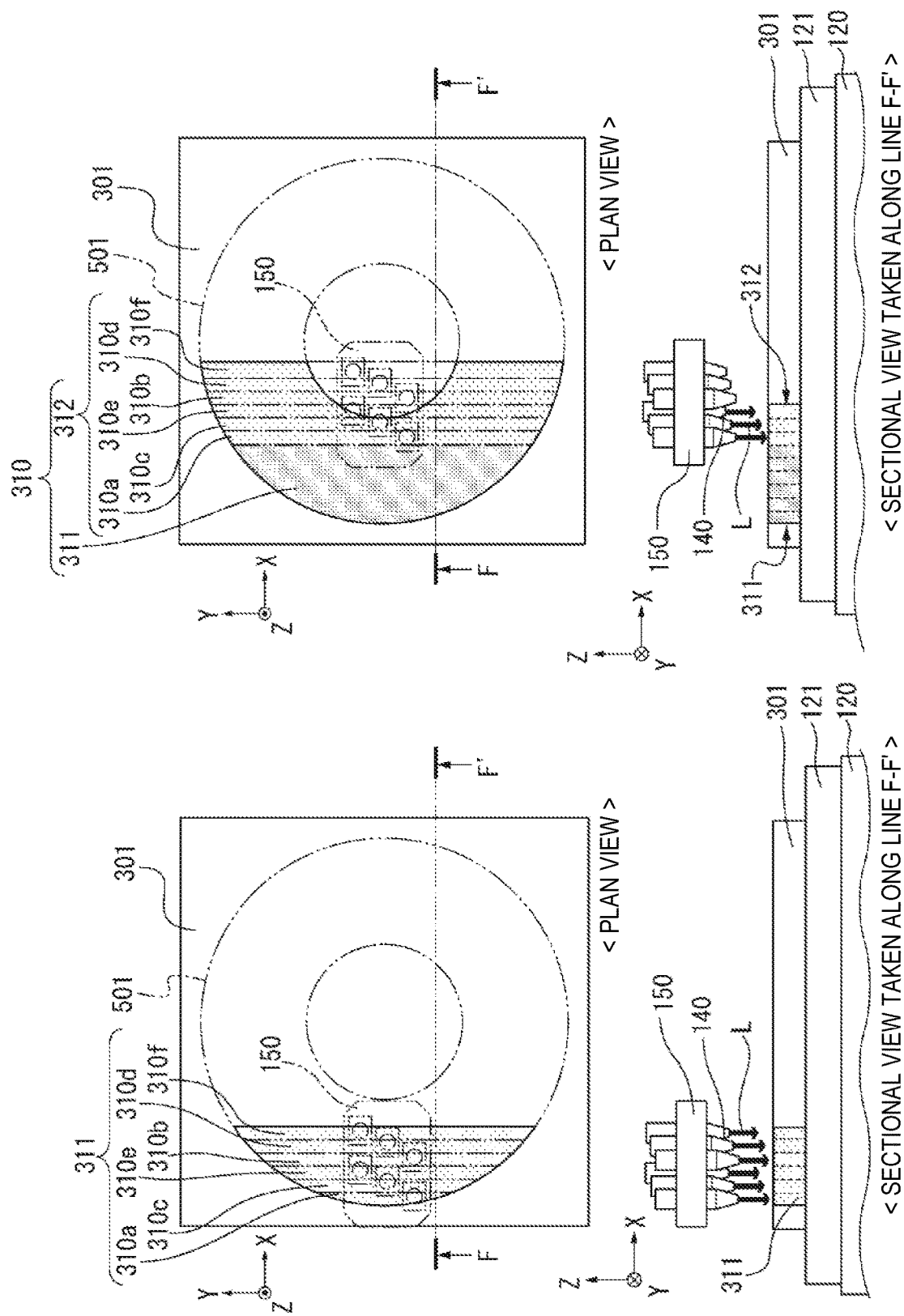

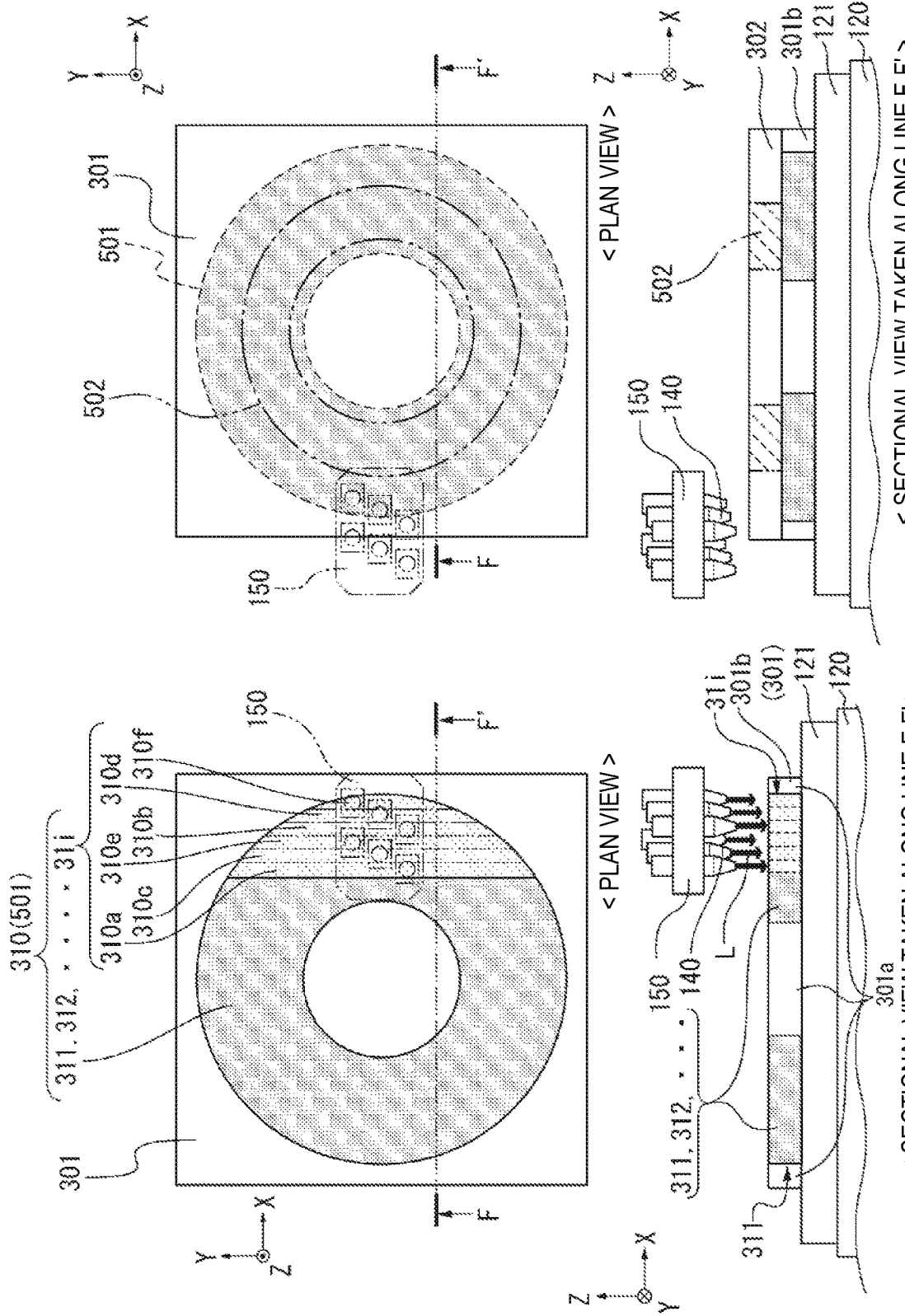

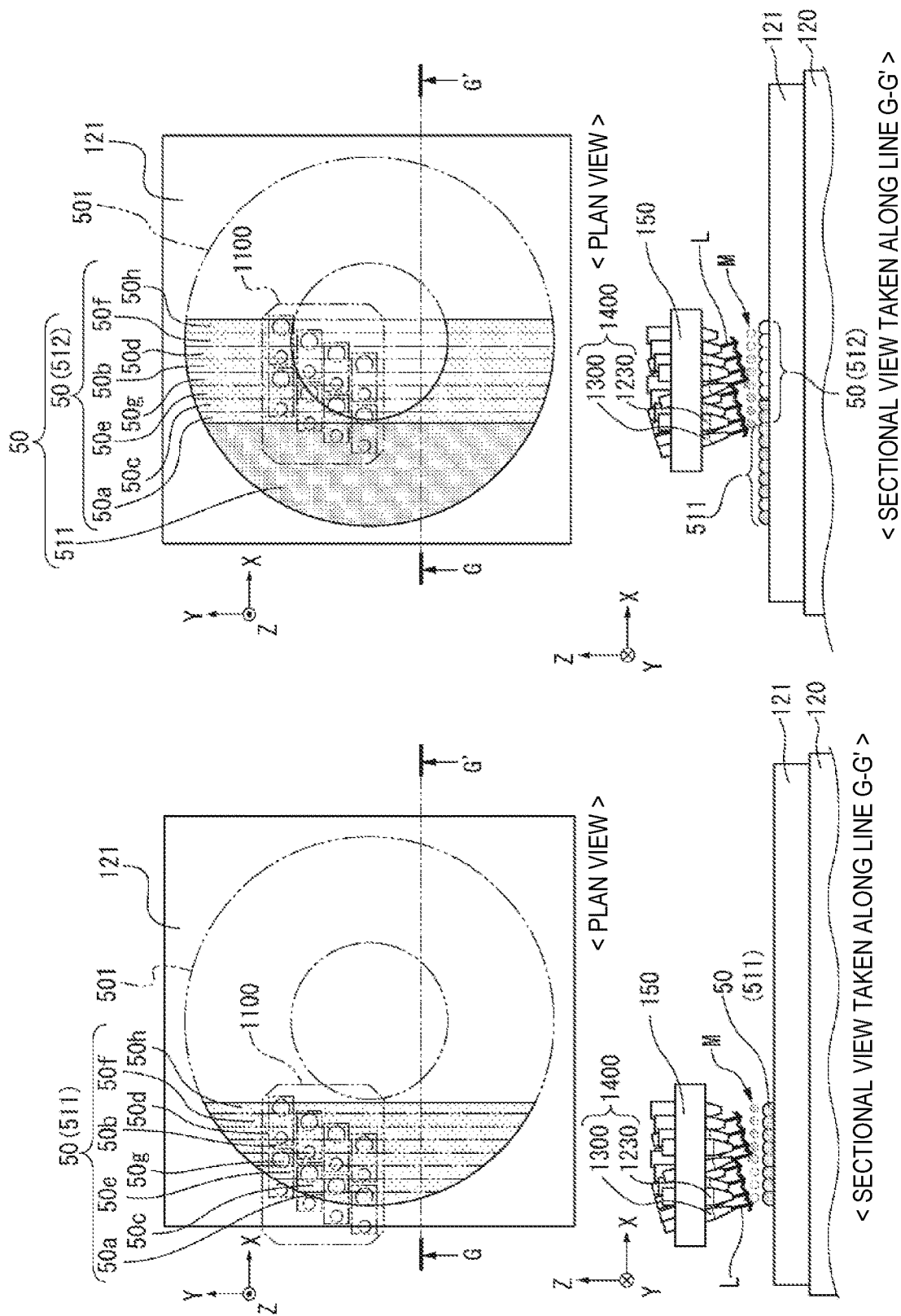

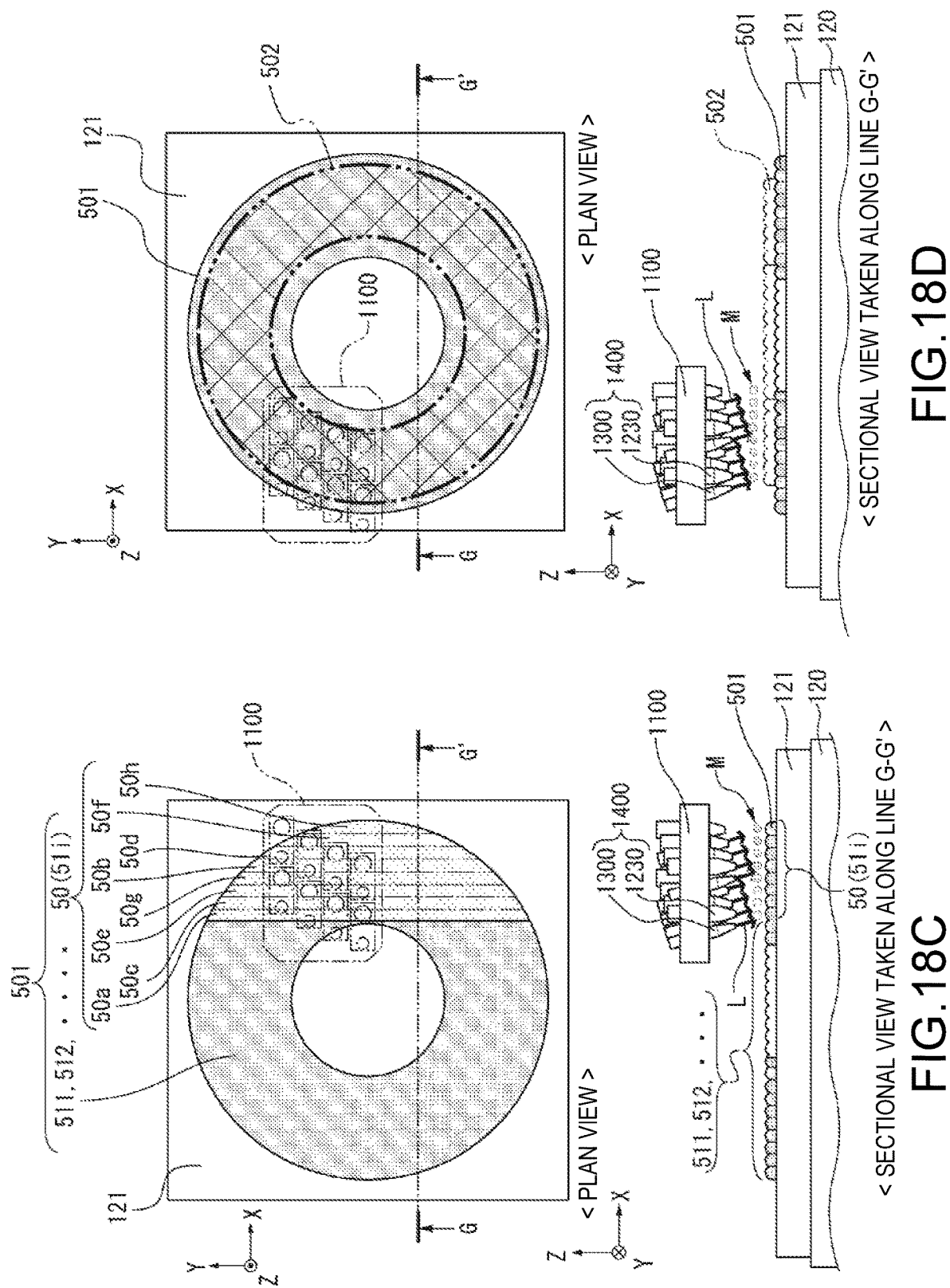

< SECTIONAL VIEW >   < EXTERNAL PLAN VIEW >
FIG.21A
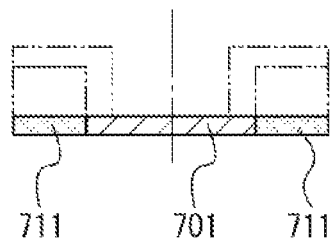 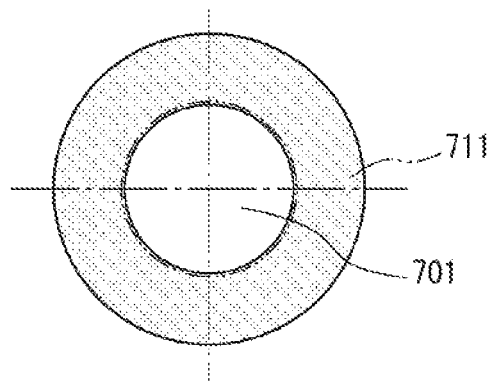
FIG.21B
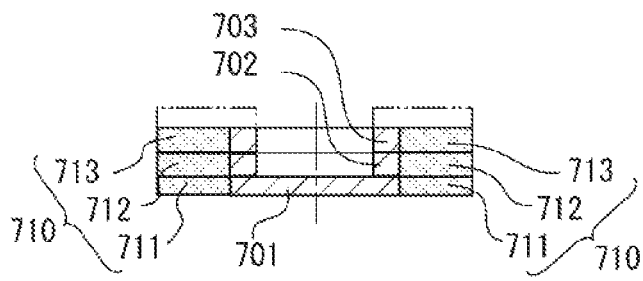 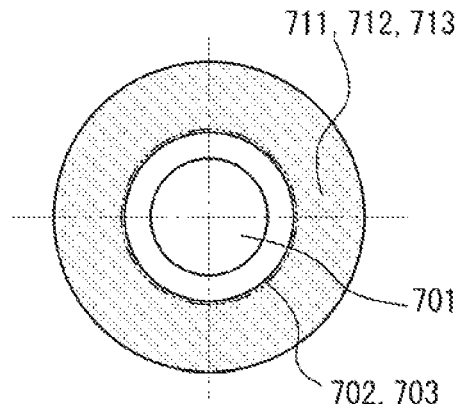
FIG.21C
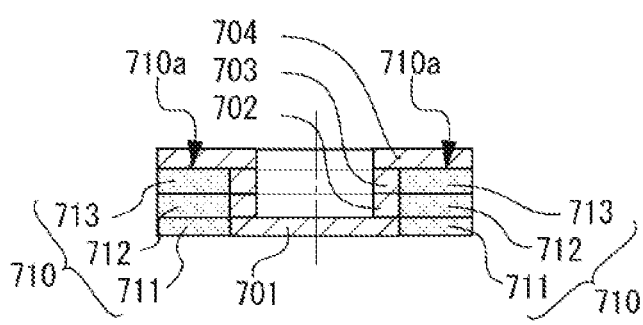 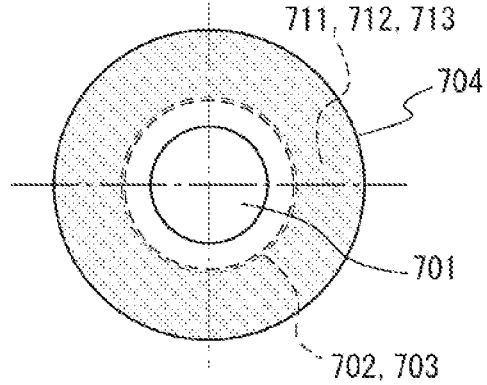
FIG.21D
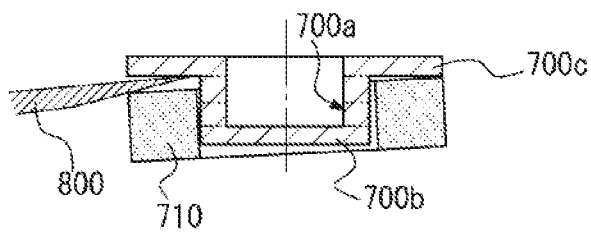 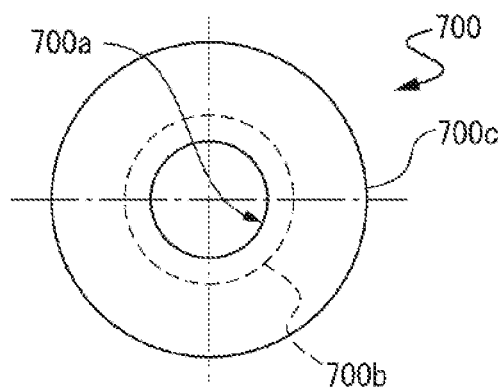

THREE-DIMENSIONAL FORMING APPARATUS AND THREE-DIMENSIONAL FORMING METHOD

BACKGROUND

1. Technical Field

The present invention relates to a three-dimensional forming apparatus and a three-dimensional forming method.

2. Related Art

In the related art, a method described in JP-A-2008-184622 is disclosed as a manufacturing method of simply forming a three-dimensional shape using a metal material. The three-dimensional fabricated object manufacturing method disclosed in JP-A-2008-184622 is used to form a metal paste, which includes metal powder, a solvent, and an adhesion enhancer in a raw material, in material layers of a layered state. Then, metal sintered layers or metal melted layers are formed by radiating a light beam to material layers in the layered state and the sintered layers or the melted layers are stacked by repeating the forming of the material layers and the radiation of the light beam, so that a desired three-dimensional fabricated object can be obtained.

A three-dimensional fabricated object is suggested to be formed by supplying a metal powder using a powder metal buildup nozzle capable of building up a (three-dimensional) form, as disclosed in JP-A-2005-219060, or a powder supply nozzle capable of performing buildup and welding, as disclosed in JP-A-2013-75308, and by melting and solidifying the supplied metal powder with a laser.

A three-dimensional fabricated object can be formed by forming and stacking sintered layers to material layers, as in a method disclosed in JP-A-2008-184622, or a three-dimensional fabricated object can be formed by repeating buildup, as in methods disclosed in JP-A-2005-219060 and JP-A-2013-75308. These methods are methods of forming one single layer which forms a three-dimensional fabricated object and stacking the single layers. In a case in which the single layer of one configuration in a three-dimensional fabricated object is formed, laser radiation is scanned to draw a trajectory so that a formed sintered portion is filled in the case of JP-A-2008-184622 and a nozzle is moved along a trajectory drawn so that the shape of a sintered portion is filled in the cases of JP-A-2005-219060 and JP-A-2013-75308. That is, to draw the above-described trajectory by relatively moving a table for forming the three-dimensional fabricated object and a laser radiation device or the nozzle, a device driving unit necessarily performs minute control for the relative movement.

A time taken to form the above-described single layer increases as the length of the trajectory is longer, that is, the area of the sintered portion is greater. Accordingly, to improve productivity, a scanning speed of the laser radiation or a movement speed of the nozzle is necessarily increased. However, when an output of the laser is not high, there is a concern of a sintering fault or a melting fault occurring.

SUMMARY

An advantage of some aspects of the invention is that it provides a three-dimensional forming apparatus with high productivity by driving a plurality of energy supply units synchronously with a simple configuration.

The invention can be implemented as the following forms or application examples.

Application Example 1

A three-dimensional forming apparatus according to this application example includes: a stage; a material supply unit that supplies the stage with a sintered material including metal powder and a binder; a head unit that includes an energy radiation unit supplying energy capable of sintering the sintered material to the sintered material supplied by the material supply unit; a head base that holds a plurality of the head units; and a driving unit that is capable of three-dimensionally moving the head base relative to the stage.

A sintered portion corresponding to one energy radiation unit is formed along one path of the relative movement of the head base relative to the stage by energy radiated from the energy radiation unit included in one head unit. Accordingly, the three-dimensional forming apparatus according to the application example includes the plurality of head units in the head base, and thus a plurality of sintered portions can be formed along one path of the head base. Accordingly, it is possible to shorten a relative movement path length between the head base and the stage along which a desired sintered region is formed, and thus it is possible to obtain the three-dimensional forming apparatus with high productivity.

Application Example 2

A three-dimensional forming apparatus according to this application example includes: a stage; a material supply unit that includes a material ejection unit supplying a sintered material including metal powder and a binder to the stage; an energy radiation unit that supplies energy capable of sintering the sintered material to the sintered material supplied by the material supply unit; a head base that holds a plurality of head units in which the material ejection unit and the energy radiation unit are held; and a driving unit that is capable of three-dimensionally moving the head base relative to the stage.

A sintered portion corresponding to one head unit is formed along one path of the relative movement of the head base relative to the stage by energy radiated from the energy radiation unit to the sintered material supplied from the material ejection unit included in one head unit. Accordingly, the three-dimensional forming apparatus according to the application example includes the plurality of head units in the head base, and thus a plurality of sintered portions can be formed along one path of the head base. Accordingly, it is possible to shorten a relative movement path length between the head base and the stage along which a desired sintered region is formed, and thus it is possible to obtain the three-dimensional forming apparatus with high productivity.

In the three-dimensional forming apparatus according to the application example, the amount of sintered material necessary in a region in which the shape of a three-dimensional fabricated object to be formed is formed is supplied and the energy is supplied from the energy radiation unit to the supplied sintered material. Therefore, a loss of the supplied material and a loss of the supplied energy are reduced.

Application Example 3

In the application example described above, of the plurality of material supply units, the material supply unit including the material ejection unit held in at least one of the head units may accommodate the different sintered material from the other material supply units.

According to this application example, the material supply unit supplying the sintered material for each different composition can be included. Thus, the material can be supplied from each material supply unit of each composition, and thus different materials can be sintered or melted by the energy radiation units. Thus, it is possible to easily form the fabricated object formed of the materials of two or more kinds of compositions.

Application Example 4

In the application example described above, the energy may be a laser.

According to this application example, the radiation of the energy can be focused on a supply material which is a target, and thus a three-dimensional fabricated object with good quality can be formed. For example, a radiated energy amount (power or a scanning speed) can be easily controlled according to a kind of sintered material, and thus the three-dimensional fabricated object with desired quality can be obtained.

Application Example 5

A three-dimensional forming method according to this application example includes: supplying a stage with a sintered material including metal powder and a binder; forming a single layer by moving a head base that holds a plurality of head units including an energy radiation unit that supplies energy capable of sintering the sintered material relative to the stage, supplying the energy to the sintered material, and sintering the sintered material; and forming a second layer in the forming of the single layer by stacking the second layer on a first single layer formed in the forming of the single layer. The forming of the second layer is repeated a predetermined number of times.

A sintered portion corresponding to one energy radiation unit is formed along one path of the relative movement of the head base relative to the stage by energy radiated from the energy radiation unit included in one head unit. Accordingly, in the three-dimensional forming method according to the application example, the three-dimensional forming apparatus including the plurality of head units in the head base is used, and thus a plurality of sintered portions can be formed along one path of the head base. Accordingly, it is possible to shorten a relative movement path length between the head base and the stage along which a desired sintered region is formed, and thus it is possible to obtain the three-dimensional forming method with high productivity.

In the application example, the "first single layer" and the "second single layer" do not mean the first and second layers of stacked single layers. A single layer in the stack lower portion of repeatedly stacked single layers is referred to as the "first single layer" and a single layer stacked on the first single layer is referred to as the "second single layer".

Application Example 6

A three-dimensional forming method according to this application example includes: forming a single layer, the forming of the single layer including ejecting a sintered material including metal powder and a binder from a material ejection unit to a stage by moving, relative to the stage, a head base that holds a plurality of head units holding the material ejection unit included in a material supply unit that supplies the sintered material to the stage and an energy radiation unit supplying energy capable of sintering the sintered material to the sintered material supplied by the material supply unit, and including supplying the energy to the sintered material ejected in the ejecting of the sintered material and sintering the sintered material; and forming a second single layer in the forming of the single layer by stacking the second single layer on the first single layer formed in the forming of the single layer. The forming of the second layer is repeated a predetermined number of times.

A sintered portion corresponding to one head unit is formed along one path of the relative movement of the head base relative to the stage by energy radiated from the energy radiation unit to the sintered material supplied from the material ejection unit included in one head unit. Accordingly, in the three-dimensional forming method according to the application example, the three-dimensional forming apparatus including the plurality of head units in the head base can be used, and thus a plurality of sintered portions can be formed along one path of the head base. Accordingly, it is possible to shorten a relative movement path length between the head base and the stage along which a desired sintered region is formed, and thus it is possible to obtain the three-dimensional forming method with high productivity.

In the application example, the "first single layer" and the "second single layer" do not mean the first and second layers of stacked single layers. A single layer in the stack lower portion of repeatedly stacked single layers is referred to as the "first single layer" and a single layer stacked on the first single layer is referred to as the "second single layer".

Application Example 7

In the application example described above, of the plurality of material supply units, the material supply unit including the material ejection unit held in at least one of the head units may accommodate the different sintered material from the other material supply units.

According to this application example, the material supply unit supplying the sintered material for each different composition can be included. Thus, the material can be supplied from each material supply unit of each composition, and thus different materials can be sintered or melted by the energy radiation units. Thus, it is possible to easily form the fabricated object formed of the materials of two or more kinds of compositions.

Application Example 8

In the application example described above, the energy may be a laser.

According to this application example, the radiation of the energy can be focused on a supply material which is a target, and thus a three-dimensional fabricated object with good quality can be formed. For example, a radiated energy amount (power or a scanning speed) can be easily controlled according to a kind of sintered material, and thus the three-dimensional fabricated object with desired quality can be obtained.

BRIEF DESCRIPTION OF THE DRAWINGS

The invention will be described with reference to the accompanying drawings, wherein like numbers reference like elements.

FIG. 2A is an external diagram illustrating the head base in a direction indicated by an arrow A illustrated in FIG. 1, and FIG. 2B is a schematic sectional view taken along the line B-B' illustrated in FIG. 2A.

FIG. 4A is a schematic diagram illustrating the configuration of a three-dimensional forming apparatus according to a second embodiment and FIG. 4B is an enlarged view of a portion C illustrated in FIG. 4A.

FIGS. 13A and 13B are schematic plan views illustrating steps of the three-dimensional forming method according to the third embodiment and are sectional views taken along the line F-F' illustrating in the schematic plan views.

FIGS. 14C and 14D are schematic plan views illustrating steps of the three-dimensional forming method according to the third embodiment and are sectional views taken along the line F-F' illustrating in the schematic plan views.

FIGS. 17A and 17B are schematic plan views illustrating steps of the three-dimensional forming method according to the fourth embodiment and are sectional views taken along the line G-G' illustrating in the schematic plan views.

FIGS. 18C and 18D are schematic plan views illustrating steps of the three-dimensional forming method according to the fourth embodiment and are sectional views taken along the line G-G' illustrating in the schematic plan views.

FIGS. 21A to 21D are sectional views and plan views illustrating the three-dimensional forming method according to the fifth embodiment.

DESCRIPTION OF EXEMPLARY EMBODIMENTS

Hereinafter, embodiments of the invention will be described with reference to the drawings.

First Embodiment

Figure 1:
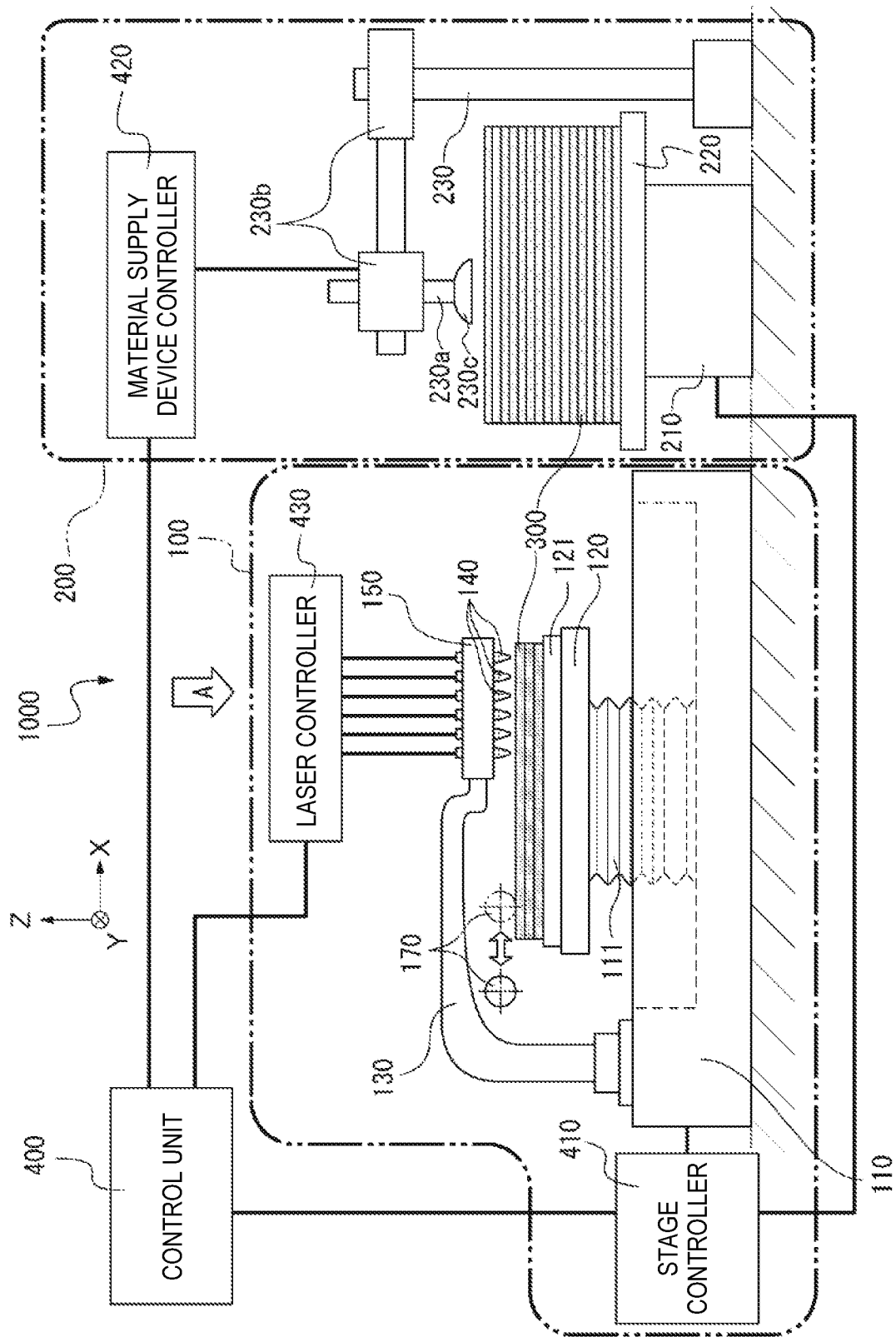
FIG. 1 is a schematic diagram illustrating the configuration of a three-dimensional forming apparatus according to a first embodiment.

FIG. 1 is a schematic diagram illustrating the configuration of a three-dimensional forming apparatus according to a first embodiment. In the present specification, "three-dimensional forming" refers to forming a so-called stereoscopically fabricated object and includes, for example, forming a shape having a thickness even when the shape is a flat shape or a so-called two-dimensional shape.

A three-dimensional forming apparatus 1000 (hereinafter referred to as a forming apparatus 1000) illustrated in FIG. 1 includes a sintering device 100 that forms a three-dimensional fabricated object and a material supply device 200 serving as a material supply unit that supplies the sintering device 100 with supply material 300 (hereinafter referred to as a green sheet 300) called a so-called green sheet in which metal powder and a binder which are raw material of the three-dimensional fabricated object are kneaded and formed to a sheet shape.

The material supply device 200 includes a supply base 210, a supply table 220 that can be driven in the Z axis direction oriented in the illustrated gravity direction by a driving unit (not illustrated) included in the supply base 210, and a transfer device 230 that holds one topmost stacked green sheet among a plurality of green sheets 300 placed on the supply table 220 and transfers the green sheet to the sintering device 100.

The transfer device 230 includes a sheet holding unit 230a that is capable of holding the green sheet 300 and a supply driving unit 230b that moves the sheet holding unit 230a to the supply table 220 relatively in at least the X axis direction and the Y axis direction. The sheet holding unit 230a includes a sheet adsorption unit 230c serving as, for example, a unit capable of holding and detaching the green sheet 300 in depressurization and sucking manners, and thus the green sheet 300 can be adsorbed and held by the sheet adsorption unit 230c. The method of holding the green sheet 300 by the sheet adsorption unit 230c is not limited to the above-described method. For example, when a raw material metal is a magnetic material, the green sheet may be mechanically held using a magnetic-force adsorption method or the like or pilot holes.

The sintering device 100 includes a base 110, a stage 120 that can be moved in the illustrated X, Y, or Z direction or can be driven in a rotational direction about the Z axis by a driving device 111 serving as a driving unit included in the base 110, and a head base supporting unit 130 that has one end portion fixed to the base 110 and the other end portion holding and fixing a head base 150 in which a plurality of energy radiation units 140 are held. In the embodiment, a configuration in which the stage 120 is driven in the X, Y, or Z direction by the driving device 111 will be described. However, the invention is not limited thereto. The stage 120 and the head base 150 may be able to be driven relatively in the X, Y, or Z direction.

The sintering device 100 includes, on the stage 120, a sample plate 121 that has heat resistance property to protect the stage 120 against heat energy radiated from an energy radiation unit to be described below. The green sheets 300 transferred from the material supply device 200 are stacked to be disposed on the sample plate 121. The sintering device 100 may include a press roller 170 that is driven to reciprocate in the X axis direction, in this example, while pressing the green sheet 300 of the topmost layer to closely adhere the green sheet 300 of an immediately below layer against the green sheet 300 transferred and stacked in the topmost layer. The press roller 170 preferably includes a unit that heats the green sheet 300 in order to improve the adhesion between the upper and lower green sheets 300.

The plurality of energy radiation units 140 held in the head base 150 will be described as the energy radiation units 140 that radiate lasers as energy in the embodiment (hereinafter the energy radiation units 140 are referred to as laser radiation units 140). By using a laser as energy to be radiated, the radiation of the energy can be focused on a supply material which is a target, and thus a three-dimensional fabricated object with good quality can be formed. For example, a radiated energy amount (power or a scanning speed) can be easily controlled according to a kind of sintered material, and thus the three-dimensional fabricated object with desired quality can be obtained.

The forming apparatus 1000 includes a control unit 400 serving as a control unit that controls the stage 120, the supply table 220, the laser radiation unit 140, and the transfer device 230 described above based on fabrication data of the three-dimensional fabricated object output from, for example, a data output apparatus such as a personal computer (not illustrated). The control unit 400 includes a driving control unit of the stage 120, a driving control unit of the supply table 220, a driving control unit of the laser radiation unit 140, and a driving control unit of the transfer device 230 and includes a control unit that controls the driving control units such that these units are driven in tandem, although not illustrated.

Signals for controlling movement start and stop, a movement direction, a movement amount, and a movement speed of the stage 120 or the supply table 220 are generated in a stage controller 410 based on control signals from the control unit 400 by the driving device 111 included in the base 110, and thus the stage 120 included to be movable with respect to the base 110 and the supply table 220 included to be movable to the supply base 210 are sent to the driving device 111 included in the base 110 or a driving device (not illustrated) included in the supply base 210 to be driven.

Signals for controlling movement of the sheet holding unit 230a by the supply driving unit 230b included in the transfer device 230 and the holding or detachment of the green sheet 300 to or from the sheet adsorption unit 230c are generated based on control signals from the control unit 400 in a material supply device controller 420, and thus the transfer of the transfer device 230 included in the material supply device 200 transferred to the sintering device 100 of the green sheets 300 is controlled.

In regard to the laser radiation unit 140 held in the head base 150, control signals are sent from the control unit 400 to a laser controller 430 and output signals for causing one or all of the plurality of laser radiation units 140 to radiate lasers are sent from the laser controller 430. The radiation of the lasers from the laser radiation units 140 is controlled such that the lasers are radiated to sinter-formed regions obtained from shape data of a predetermined three-dimensional fabricated object in the green sheets 300 placed on the stage 120 in synchronization with driving signals of the stage 120 by the stage controller 410.

Figure 2A:
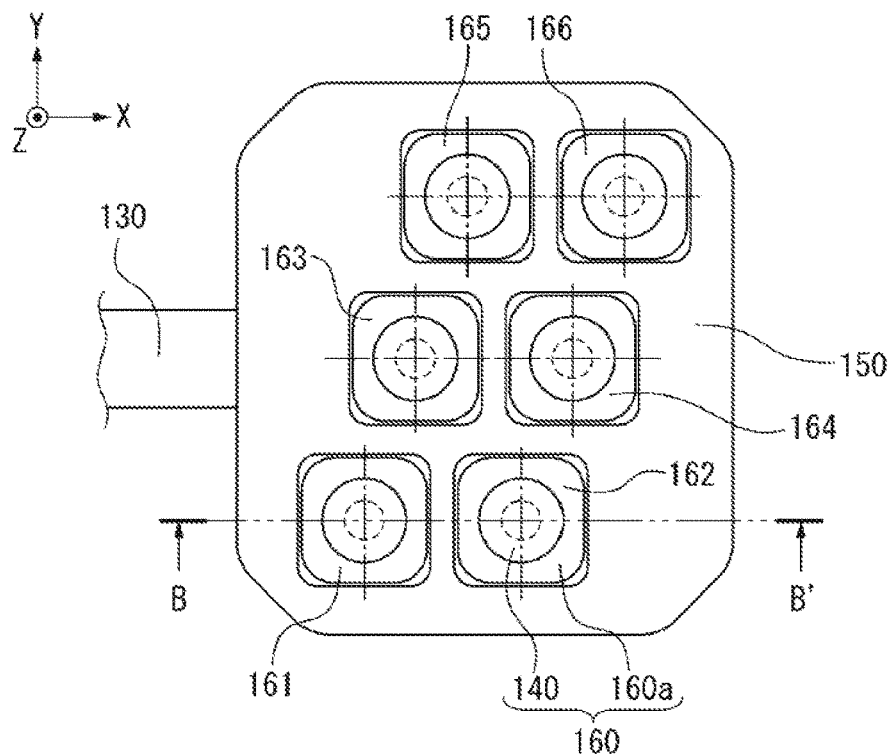
FIGS. 2A and 2B are diagrams illustrating an example of a holding form of a plurality of head units held in a head base according to the first embodiment.
Figure 2B:
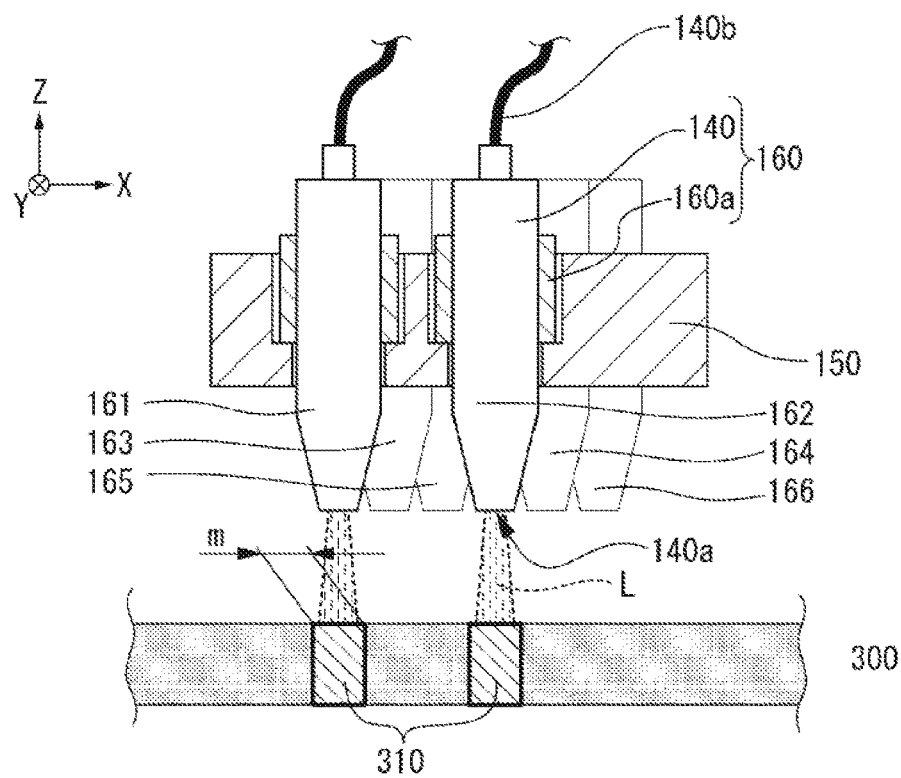

FIGS. 2A and 2B are diagrams illustrating an example of a holding form of the laser radiation units 140 included in a plurality of head units 160 held in the head base 150. FIG. 2A is an external diagram illustrating the head base 150 in a direction indicated by an arrow A illustrated in FIG. 1. FIG. 2B is a schematic sectional view taken along the line B-B' illustrated in FIG. 2A.

As illustrated in FIG. 2A, the plurality of head units 160 are held in the head base 150 included in the forming apparatus 1000 according to the first embodiment. As illustrated in FIG. 2B, the head unit 160 includes the laser radiation unit 140 and a holding tool 160a that holds the laser radiation unit 140 so that a laser outlet 140a from which a laser L of the laser radiation unit 140 exits is disposed toward the green sheet 300 in the head base 150. The head unit 160 is fixed to the head base 150 by a fastening unit (not illustrated) which can be detachably mounted.

In the embodiment, six sets of head units 160 are fastened to the head base 150. As illustrated in FIG. 2A, first head units 161 and 162, second head units 163 and 164, and third head units 165 and 166 in one line of two sets are disposed in three lines from the lower side of the drawing. As illustrated in FIG. 2B, sintered portions 310 with a sintering width r are formed in the green sheet 300 by the lasers L radiated from the laser radiation units 140, so that a part of the configuration of a three-dimensional fabricated object is formed as an aggregate of the sintered portions 310 formed by the lasers L radiated from the laser radiation units 140 included in the plurality of head units 161, 162, 163, 164, 165, and 166 held in the head base 150.

Figure 3A:
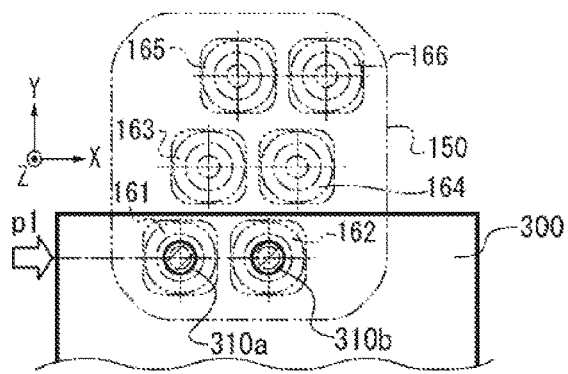
FIGS. 3A to 3E are plan views conceptually illustrating a relation between disposition of the head units and form shapes of sintered portions according to the first embodiment.

FIGS. 3A to 3E are plan views (in the direction indicated by the arrow A illustrated in FIG. 1) conceptually illustrating a relation between disposition of the head units 160 and form shapes of the sintered portions 310. First, as illustrated in FIG. 3A, the lasers L are radiated from the laser radiation units 140 of the head units 161 and 162 at a sintering start point p1 of the green sheet 300, so that sintered portions 310a and 310b are formed. To facilitate the description, the sintered portions 310 are hatched even in the plan views.

Figure 3B:
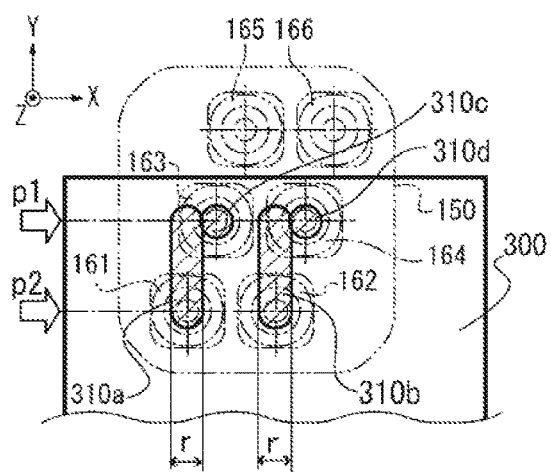

While the lasers L are radiated from the head units 161 and 162, the green sheet 300 is moved in the Y (+) direction relative to the head base 150 up to a position at which the sintering start point p1 illustrated in FIG. 3B corresponds to the second head units 163 and 164. Accordingly, the sintered portions 310a and 310b extend from the sintering start point p1 to a position p2 after the relative movement of the green sheet 300 so that the sintering width r is maintained. Further, the lasers L are radiated from the second head units 163 and 164 corresponding to the sintering start point p1, so that sintered portions 310c and 310d are formed.

The lasers L are radiated at the position at which the sintering start point p1 illustrated in FIG. 3B corresponds to the second head units 163 and 164, so that the sintered portions 310c and 310d start to be formed. While the lasers L are radiated from the head units 163 and 164, the green sheet 300 is moved up to a position at which the sintering start point p1 illustrated in FIG. 3C corresponds to the third head units 165 and 166 relative to the head base 150. Accordingly, the sintered portions 310c and 310d extend from the sintering start point p1 to the position p2 after the relative movement of the green sheet 300 so that the sintering width r is maintained. Simultaneously, the sintered portions 310a and 310b extend from the sintering start point p1 to a position p3 after the relative movement of the green sheet 300 so that the sintering width r is maintained. Further, the lasers L are radiated from the third head units 165 and 166 corresponding to the sintering start point p1, so that sintered portions 310e and 310f are formed.

Figure 3C:
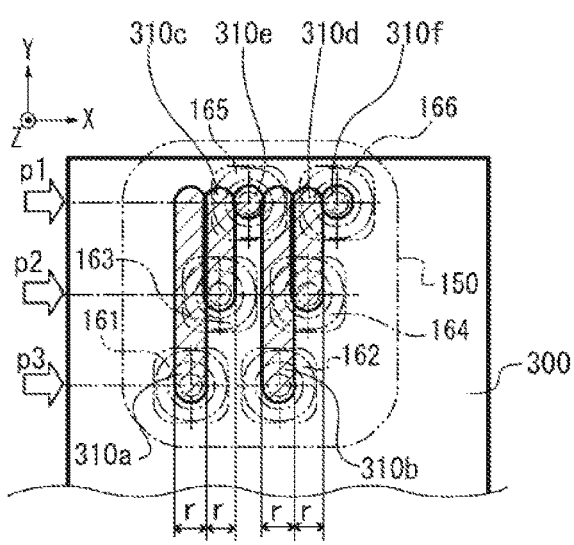
Figure 3D:
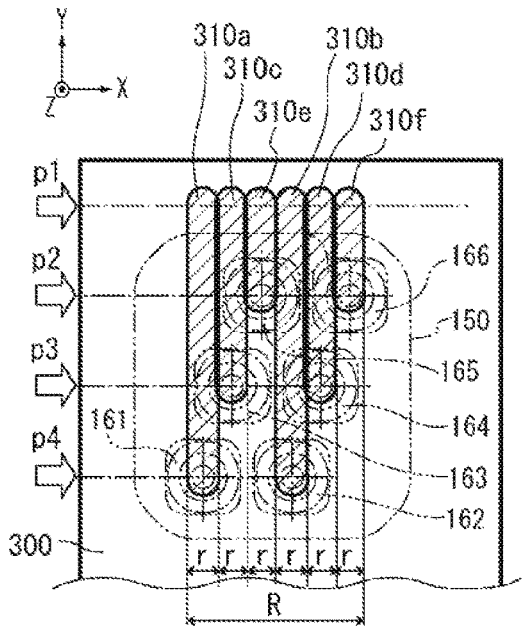

The lasers L are radiated at the position at which the sintering start point p1 illustrated in FIG. 3C corresponds to the third head units 165 and 166, so that the sintered portions 310e and 310f start to be formed. While the lasers L are radiated from the head units 165 and 166, the green sheet 300 is moved relative to the head base 150 so that the sintering start point p1 illustrated in FIG. 3D is further moved in the Y (+) direction. Accordingly, the sintered portions 310e and 310f extend from the sintering start point p1 to the position p2 after the relative movement of the green sheet 300 so that the sintering width r is maintained. Simultaneously, the sintered portions 310a and 310b extend from the sintering start point p1 to a position p4 after the relative movement of the green sheet 300 and the sintered portions 310c and 310d extend from the sintering start point p1 to the position p3 after the relative movement so that the sintering width r is maintained.

Figure 3E:
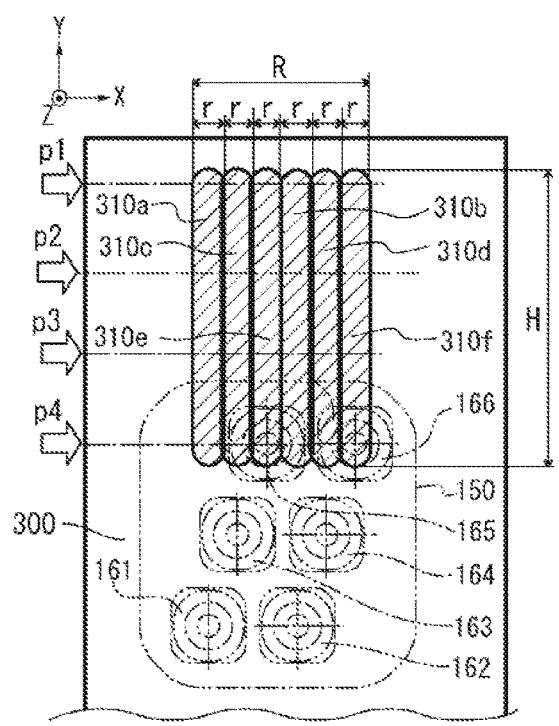

In a case in which the position p4 is set to a sintering end position (hereinafter the position p4 is referred to as the sintering end point p4), the radiation of the lasers L from the head units 161 and 162 is stopped at the sintering end point p4 illustrated in FIG. 3D. Further, while the green sheet 300 is moved relatively in the Y (+) direction, the lasers L are radiated until the head units 163, 164, 165, and 166 reach the sintering end point p4. As illustrated in FIG. 3E, the sintered portions 310c, 310d, 310e, and 310f are formed from the sintering start point p1 to the sintering end point p4 so that the sintering width r is maintained. In this way, by radiating the lasers L sequentially from the head units 161, 162, 163, 164, 165, and 166 while moving the green sheet 300 from the sintering start point p1 to the sintering end point p4, it is possible to form the substantially rectangular sintered portions 310 with a width R and a length H in the example of the embodiment.

As described above, the sintering device 100 included in the forming apparatus 1000 according to the first embodiment can form the sintered portions 310 with a desired shape in the green sheet 300 by selectively radiating the lasers L from the head units 161, 162, 163, 164, 165, and 166 in synchronization with the movement of the green sheet 300. As described above, by merely moving the green sheet 300 in one direction of the Y axis direction in the embodiment, it is possible to obtain the sintered portions 310 with a desired shape in a region with a width R×a length H illustrated in FIG. 3E. Thus, it is possible to obtain a partial fabricated object to be described below as an aggregate of the sintered portions 310.

The forming apparatus 1000 in which the green sheet 300 is supplied from the material supply device 200 to the sintering device 100 has been described, but the invention is not limited thereto. For example, a material before sintering may be supplied by supplying powder metal onto the sample plate 121 and forming the powder metal with a desired thickness by a squeegee.

Second Embodiment

FIGS. 4A and 4B are schematic diagram illustrating the configuration of a three-dimensional forming apparatus according to a second embodiment. A three-dimensional forming apparatus 2000 (hereinafter referred to as a forming apparatus 2000) illustrated in FIG. 4A is different from the forming apparatus 1000 according to the first embodiment in the configuration of a material supply unit and the configuration of a head base and head units. Accordingly, the same reference numerals are given to the same constituent elements as those of the forming apparatus 1000 according to the first embodiment and the description thereof will be omitted.

As illustrated in FIGS. 4A and 4B, the forming apparatus 2000 includes a base 110, a stage 120 that can be moved in the illustrated X, Y, or Z direction or can be driven in a rotational direction about the Z axis by a driving device 111 serving as a driving unit included in the base 110, and a head base supporting unit 130 that has one end portion fixed to the base 110 and the other end portion holding and fixing a head base 1100 in which a plurality of head units 1400 including an energy radiation unit 1300 and a material ejection unit 1230 are held.

In a process of forming a three-dimensional fabricated object 500, partial fabricated objects 501, 502, and 503 are formed on the stage 120 in a layered state. In the forming of the three-dimensional fabricated objects 500, as will be described below, the sample plate 121 that has heat resistance property may be used to protect against heat of the stage 120 so that the three-dimensional fabricated objects 500 are formed on the sample plate 121, since the heat energy is radiated from the laser. For example, a ceramic plate can be used as the sample plate 121 to obtain the high heat resistance property, and further reactivity with a sintered or melted supply material is low and the three-dimensional fabricated objects 500 can be prevented from degrading. In FIG. 4A, to facilitate the description, three layers of the partial fabricated objects 501, 502, and 503 have been exemplified, but partial fabricated objects are stacked until the desired shapes of the three-dimensional fabricated objects 500 are obtained.

FIG. 4B is an enlarged view of a portion C indicating the head base 1100 illustrated in FIG. 4A.

As illustrated in FIG. 4B, the head base 1100 holds a plurality of head units 1400. As will be described below in detail, one head unit 1400 is configured such that a material ejection unit 1230 included in the material supply device 1200 serving as a material supply unit and an energy radiation unit 1300 serving as an energy radiation unit are held in a holding tool 1400a. The material ejection unit 1230 includes an ejection nozzle 1230a and an ejection driving unit 1230b that is caused to eject a material from the ejection nozzle 1230a by a material supply controller 1500.

The energy radiation unit 1300 will be described as the energy radiation unit 1300 radiating a laser as energy in the embodiment (hereinafter the energy radiation unit 1300 is referred to as a laser radiation unit 1300). The radiation of the energy can be focused on a supply material which is a target, and thus a three-dimensional fabricated object with good quality can be formed. For example, a radiated energy amount (power or a scanning speed) can be easily controlled according to a kind of sintered material, and thus the three-dimensional fabricated object with desired quality can be obtained.

The material ejection unit 1230 is connected to a supply tube 1220 and the material supply unit 1210 accommodating the supply material corresponding to each head unit 1400 held in the head base 1100. A predetermined material is supplied from the material supply unit 1210 to the material ejection units 1230. In the material supply unit 1210, material accommodation units 1210a accommodate sintered materials including the raw materials of the three-dimensional fabricated objects 500 fabricated by the forming apparatus 2000 according to the embodiment as supply materials. The individual material accommodation units 1210a are preferably connected to the individual material ejection units 1230 by the supply tubes 1220. In this way, since the individual material accommodation units 1210a are provided, a plurality of different kinds of sintered materials can be supplied from the head base 1100.

The sintered material which is the supply material is a mixed material of a slurry state (or a paste form) obtained by kneading, for example, an elementary powder of metals such as magnesium (Mg), iron (Fe), cobalt (Co), chrome (Cr), aluminum (AL), titanium (Ti), and a nickel (Ni) which are raw materials of the three-dimensional fabricated object 500, or a mixed powder of an alloy including one or more of the metals with a solvent and a thickener serving as a binder.

As illustrated in FIG. 4A, the forming apparatus 2000 includes the control unit 400 serving as a control unit controlling the above-described stage 120, the material ejection units 1230 included in the material supply device 1200, and the laser radiation units 1300 based on fabrication data of the three-dimensional fabricated objects 500 output from, for example, a data output apparatus such as a personal computer (not illustrated). Although not illustrated in the drawing, the control unit 400 includes at least a driving control unit of the stage 120, an operation control unit of the material ejection unit 1230, and an operation control unit of the laser radiation device 1300. The control unit 400 further includes a control unit that drives and operates the stage 120, the material ejection unit 1230, and the laser radiation unit 1300 in tandem.

For the stage 120 included to be movable to the base 110, signals for controlling movement start or stop and a movement direction, a movement amount, a movement speed, or the like of the stage 120 are generated in the stage controller 410 based on a control signal from the control unit 400 and are sent to the driving device 111 included in the base 110, so that the stage 120 is moved in the illustrated X, Y, or Z direction. For the material ejection unit 1230 included in the head unit 1400, a signal for controlling a material ejection amount or the like from the ejection nozzle 1230*a* in the ejection driving unit 1230*b* included in the material ejection unit 1230 is generated in a material supply controller 440 based on a control signal from the control unit 400 and a predetermined amount of material is ejected from the ejection nozzle 1230*a* by the generated signal.

Figure 5:
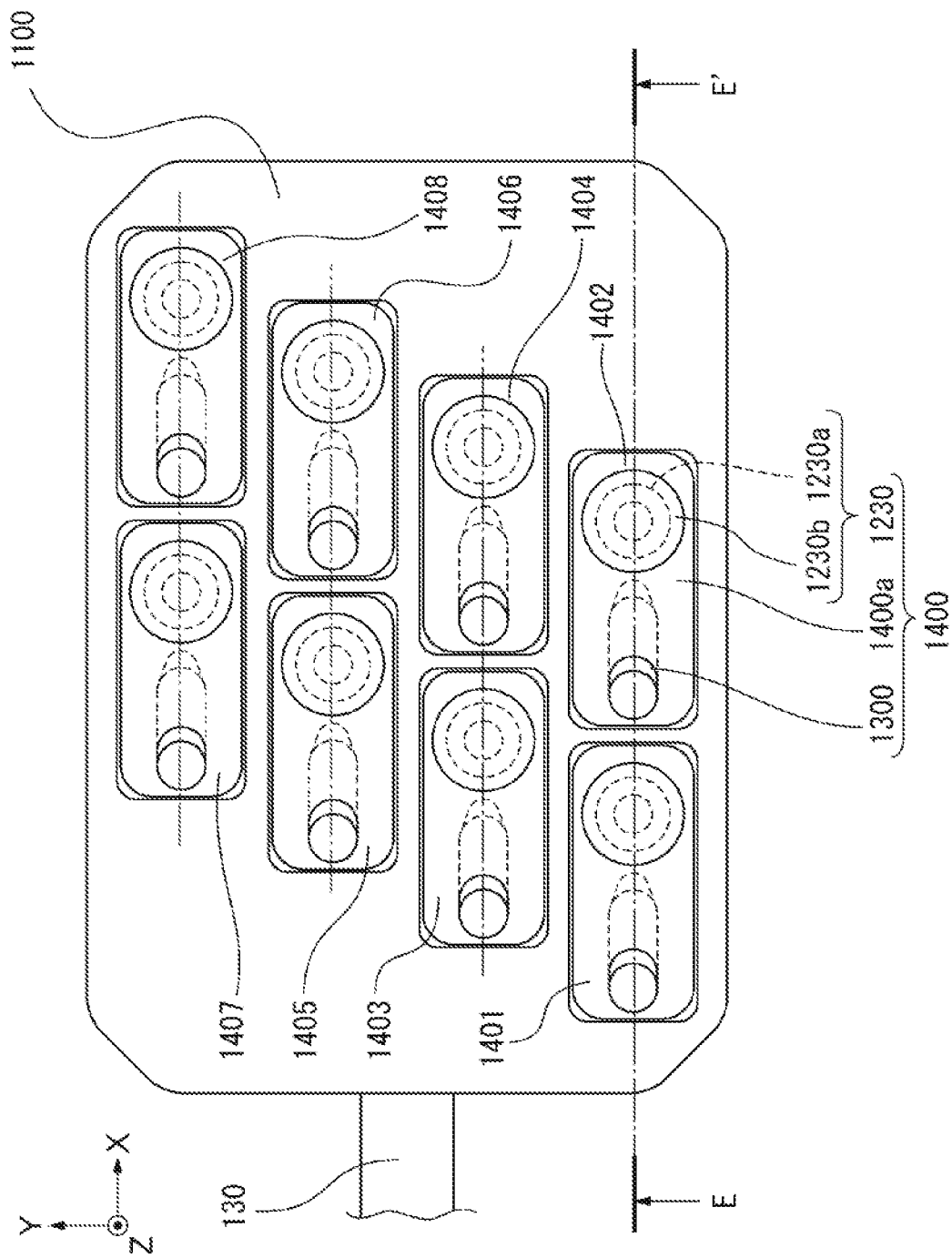
FIG. 5 is an external diagram illustrating the head base in a direction indicated by an arrow D illustrated in FIG. 4B according to the second embodiment.
Figure 6:
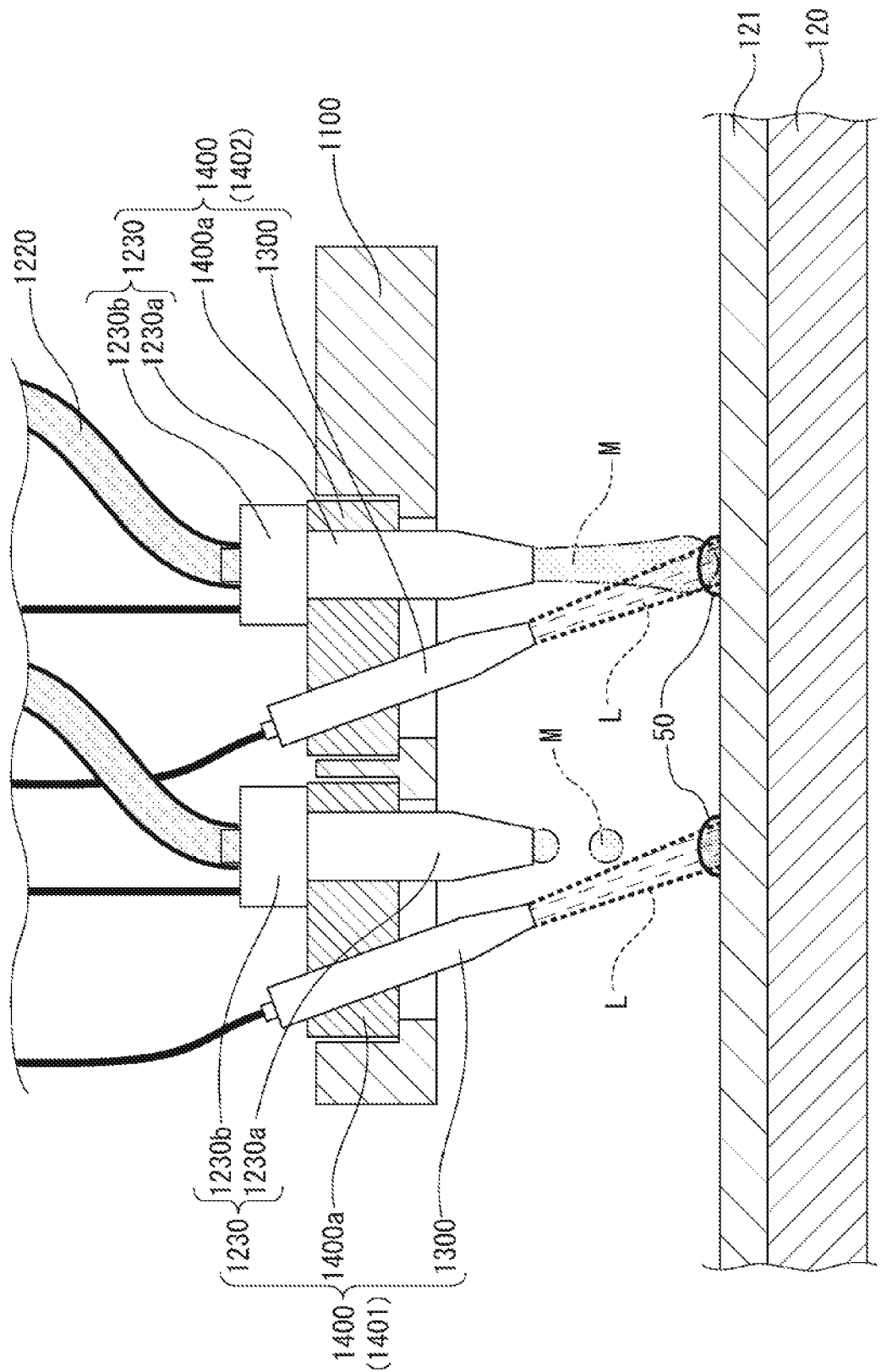
FIG. 6 is a sectional view taken along the line E-E' illustrated in FIG. 5.

FIGS. 5 and 6 illustrate an example of the holding form of the plurality of head units 1400 held in the head base 1100 and the laser radiation units 1300 and the material ejection units 1230 held in the head units 1400. FIG. 5 is an external diagram illustrating the head base 1100 in a direction indicated by an arrow D illustrated in FIG. 4B. FIG. 6 is a schematic sectional view taken along the line E-E' illustrated in FIG. 5.

As illustrated in FIG. 5, the plurality of head units 1400 are held by fixing units (not illustrated) in the head base 1100. The head base 1100 of the forming apparatus 2000 according to the embodiment include the head units 1400 of eight units, such as first head units 1401 and 1402, second head units 1403 and 1404, third head units 1405 and 1406, and fourth head units 1407 and 1408, from the lower side of the drawing. Although not illustrated, the material ejection unit 1230 included in each of the head units 1401 to 1408 is linked to the material supply unit 1210 via the ejection driving unit 1230*b* by the supply tube 1220 and the laser radiation unit 1300 is linked to the laser controller 430 to be held in the holding tool 1400*a*.

As illustrated in FIG. 6, the material ejection units 1230 eject sintered materials M (hereinafter referred to as materials M) toward the sample plate 121 placed on the stage 120 from the ejection nozzle 1230*a*. In the head unit 1401, an ejection type in which the material M is ejected in a liquid droplet form is exemplified. In the head unit 1402, an ejection type in which the material M is supplied in a continuous form is exemplified. The ejection type of the material M may be either the liquid droplet form or the continuous form. In the embodiment, the material M is assumed to be ejected in the liquid droplet form in the embodiment.

The material M ejected in the liquid droplet form from the ejection nozzle 1230*a* flies substantially in the gravity direction to be landed on the sample plate 121. The laser radiation units 1300 are held in the holding tools 1400*a* to have predetermined slopes with respect to the gravity direction so that the lasers L to be output are oriented to landing positions of the materials M. Thus the lasers L are radiated from the laser radiation units 1300 to the landed materials M and the materials M are baked and sintered so that sintered portions 50 are formed. An aggregate of the sintered portions 50 is formed as a partial fabricated object of the three-dimensional fabricated object 500 formed on the sample plate 121, for example, the partial fabricated object 501 (see FIGS. 4A and 4B).

Figure 7A:
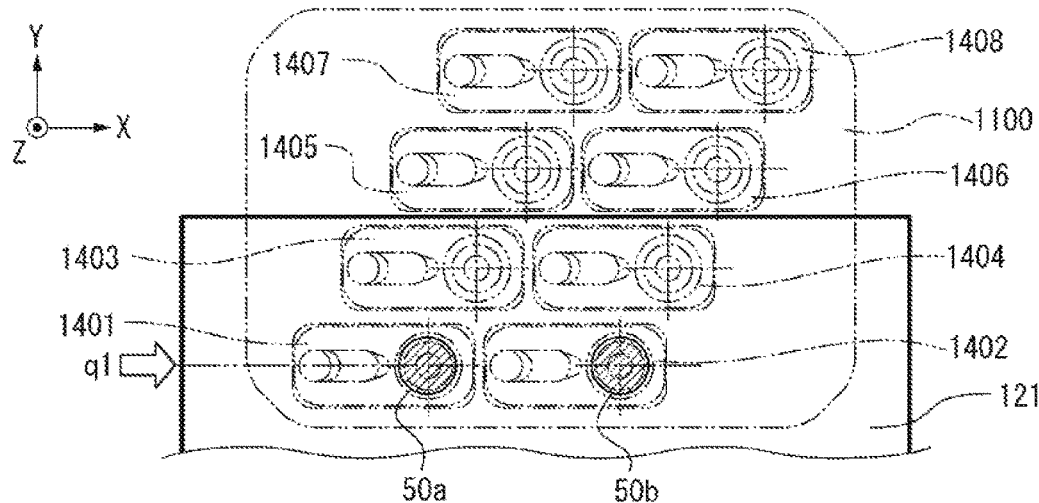
FIGS. 7A to 7C are plan views conceptually illustrating a relation between disposition of the head units and form shapes of sintered portions according to the second embodiment.

FIGS. 7A to 9 are plan views (in the direction indicated by the arrow D illustrated in FIG. 4B) conceptually illustrating a relation between disposition of the head units 1400 and form shapes of sintered portions 50. First, as illustrated in FIG. 7A, the material M is ejected from the ejection nozzles 1230*a* of the head units 1401 and 1402 at a fabrication start point q1 on the sample plate 121 and the lasers L are radiated from the laser radiation units 1300 to the materials M landed to the sample plate 121, so that sintered portions 50*a* and 50*b* are formed. To facilitate the description, the sintered portions 50 are hatched even in the plan views. The first partial fabricated object 501 formed on the upper surface of the sample plate 121 will be exemplified in the description.

First, as illustrated in FIG. 7A, the materials M are ejected from the material ejection units 1230 included in the first head units 1401 and 1402 illustrated on the lower side at the fabrication start point q1 of the partial fabricated object 501 on the sample plate 121. The lasers L are radiated from the laser radiation units 1300 included in the head units 1401 and 1402 to the ejected materials M, so that the sintered portions 50*a* and 50*b* are formed.

Figure 7B:
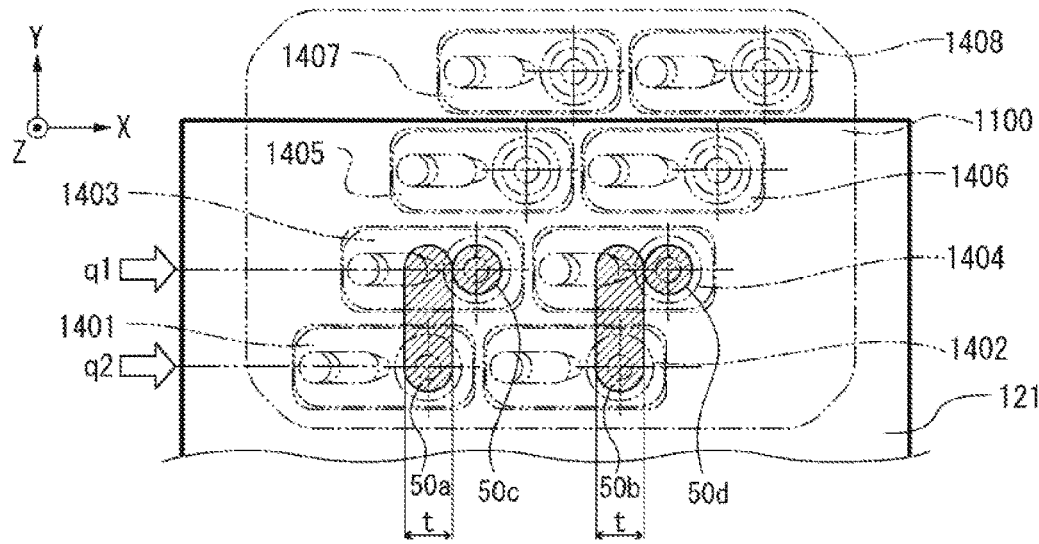

While the materials M are continuously ejected from the material ejection units 1230 of the head units 1401 and 1402 and the lasers L are continuously radiated from the laser radiation units 1300, the sample plate 121 is moved in the Y (+) direction relative to the head base 1100 up to a position at which the fabrication start point q1 illustrated in FIG. 7B corresponds to the second head units 1403 and 1404. Accordingly, the sintered portions 50*a* and 50*b* extend from the fabrication start point q1 to a position q2 after the relative movement of the sample plate 121 so that the sintering width t is maintained. Further, the materials M are ejected from the second head units 1403 and 1404 corresponding to the fabrication start point q1 and the lasers L are radiated to the materials M, so that sintered portions 50*c* and 50*d* start to be formed.

Figure 7C:
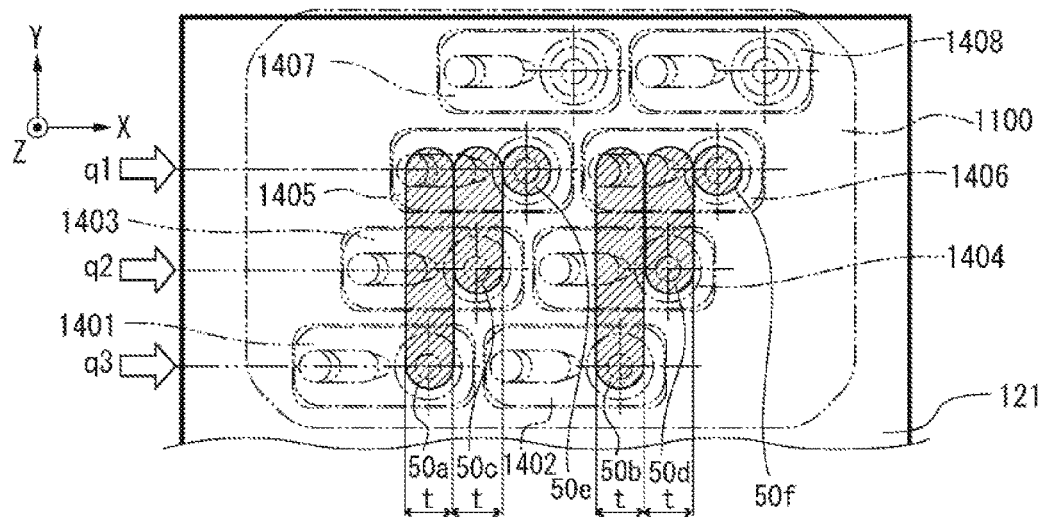

The sintered portions 50*c* and 50*d* illustrated in FIG. 7B start to be formed, and while the materials M are continuously ejected from the material ejection units 1230 of the head units 1403 and 1404, and the lasers L are continuously radiated from the laser radiation units 1300, the sample plate 121 is moved in the Y (+) direction relative to the head base 1100 up to a position at which the fabrication start point q1 illustrated in FIG. 7C corresponds to the third head units 1405 and 1406. Accordingly, the sintered portions 50*c* and 50*d* extend from the fabrication start point q1 to the position q2 after the relative movement of the sample plate 121 so that the sintering width t is maintained. Simultaneously, the sintered portions 50a and 50b extend from the fabrication start point q1 to a position q3 after the relative movement of the sample plate 121 so that the sintering width t is maintained. The materials M are ejected from the third head units 1405 and 1406 corresponding to the fabrication start point q1 and the lasers L are radiated to the materials M, so that sintered portions 50e and 50f start to be formed.

Figure 8D:
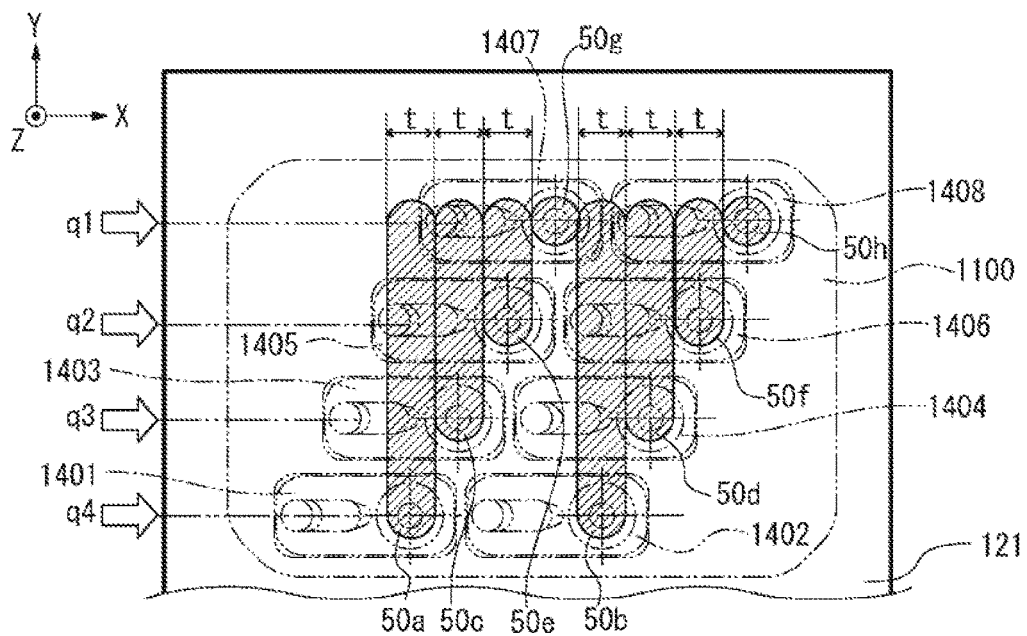
FIGS. 8D and 8E are plan views conceptually illustrating a relation between disposition of the head units and form shapes of sintered portions according to the second embodiment.

The sintered portions 50e and 50f illustrated in FIG. 7C start to be formed, and while the materials M are continuously ejected from the material ejection units 1230 of the head units 1405 and 1406, and the lasers L are continuously radiated from the laser radiation units 1300, the sample plate 121 is moved in the Y (+) direction relative to the head base 1100 up to a position at which the fabrication start point q1 illustrated in FIG. 8D corresponds to the fourth head units 1407 and 1408. Accordingly, the sintered portions 50e and 50f extend from the fabrication start point q1 to the position q2 after the relative movement of the sample plate 121 so that the sintering width t is maintained. Simultaneously, the sintered portions 50a and 50b extend from the fabrication start point q1 to a position q4 after the relative movement of the sample plate 121 and the sintered portions 50c and 50d extend from the fabrication start point q1 to the position q3 after the relative movement of the sample plate 121 so that the sintering width t is maintained. The materials M are ejected from the fourth head units 1407 and 1408 corresponding to the fabrication start point q1 and the lasers L are radiated to the materials M, so that sintered portions 50g and 50h start to be formed.

Figure 8E:
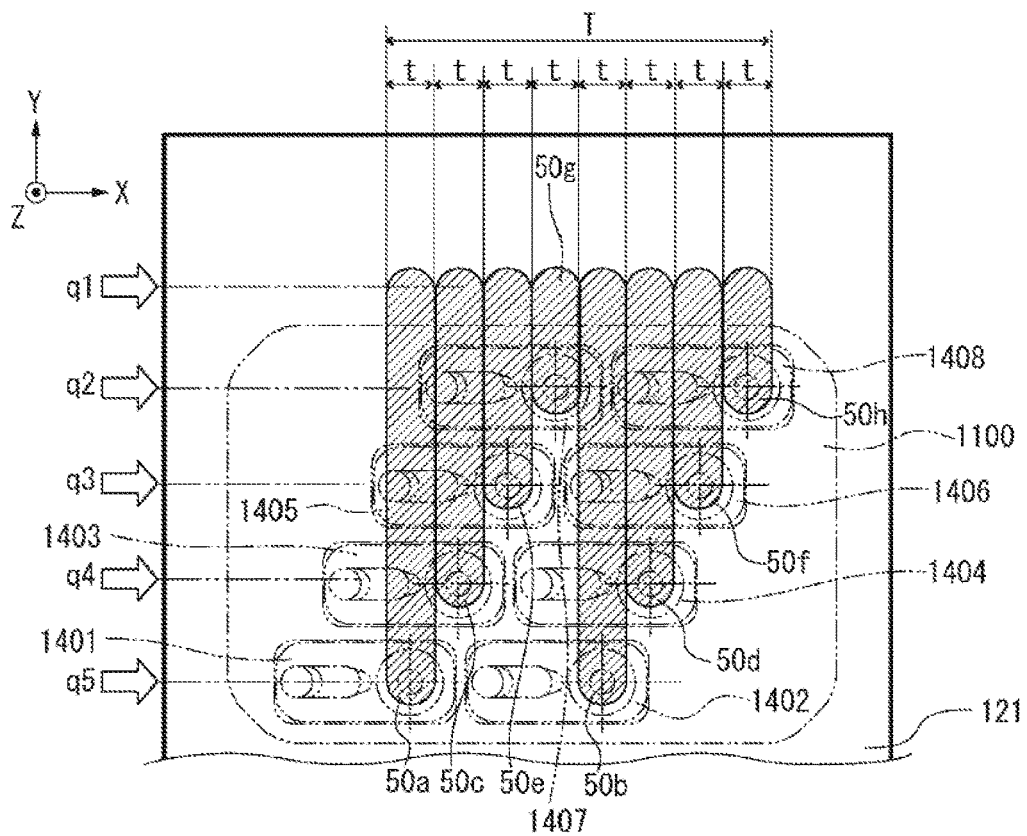
Figure 9:
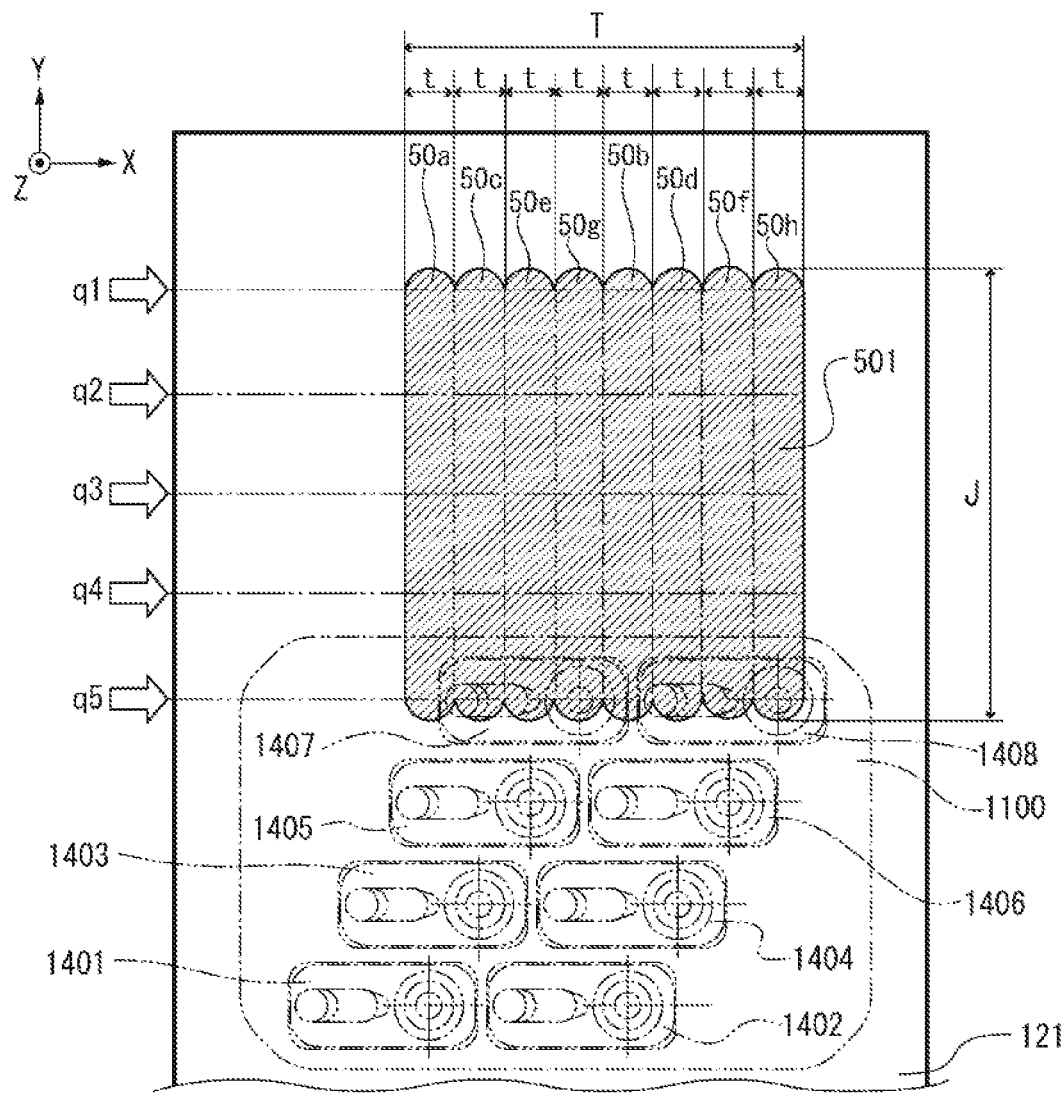
FIG. 9 is a plan view conceptually illustrating the relation between disposition of the head units and the form shapes of the sintered portions according to the second embodiment.

In a case in which the position q5 is set to a sintering end position (hereinafter the position q5 is referred to as the fabrication end point q5), as illustrated in FIG. 8E, the sample plate 121 is relatively moved until the head units 1401 and 1402 reach the fabrication endpoint q5, so that the sintered portions 50g and 50h extend. In the head units 1401 and 1402 reaching the fabrication end point q5, the ejection of the materials M from the material ejection units 1230 included in the head units 1401 and 1402 and the radiation of the lasers L from the laser radiation units 1300 are stopped. Further, while the sample plate 121 is relatively moved in the Y (+) direction, the lasers L are radiated until the head units 1403, 1404, 1405, 1406, 1407, and 1408 reach the fabrication end point q5. Thus the sintered portions 50a, 50b, 50c, 50d, 50e, 50f, 50g, and 50h are formed from the fabrication start point q1 to the fabrication end point q5 so that the sintering width t is maintained, as illustrated in FIG. 9. In this way, while the sample plate 121 is moved from the fabrication start point q1 to the fabrication end point q5, the materials M are ejected and supplied and the lasers L are radiated sequentially from the head units 1401, 1402, 1403, 1404, 1405, 1406, 1407, and 1408, so that the substantially rectangular sintered portions 50 with a width T and a length J can be formed in the example of the embodiment. Accordingly, the partial fabricated object 501 of the first layer can be formed and configured as the aggregate of the sintered portions 50.

As described above, the forming apparatus 2000 according to the second embodiment selectively performs the ejection and supply of the materials M from the material ejection units 1230 included in the head units 1401, 1402, 1403, 1404, 1405, 1406, 1407, and 1408 and the radiation of the lasers L from the laser radiation units 1300 in synchronization with the movement of the stage 120 including the sample plate 121, so that the partial fabricated object 501 with a desired shape can be formed on the sample plate 121. As described above, by merely moving the stage 120 in one direction of the Y axis direction in this example when the stage 120 is moved, it is possible to obtain the sintered portions 50 with the desired shape in a region with the width T×the length J illustrated in FIG. 9 and the partial fabricated object 501 as the aggregate of the sintered portions 50.

As the materials M ejected from the material ejection units 1230, different materials from the head units can also be ejected and supplied from one unit or two or more units of the head units 1401, 1402, 1403, 1404, 1405, 1406, 1407, and 1408. Accordingly, the forming apparatus 2000 according to the embodiment can be used to obtain the three-dimensional fabricated objects including composite partial fabricated objects formed from different kinds of materials.

Figure 10A:
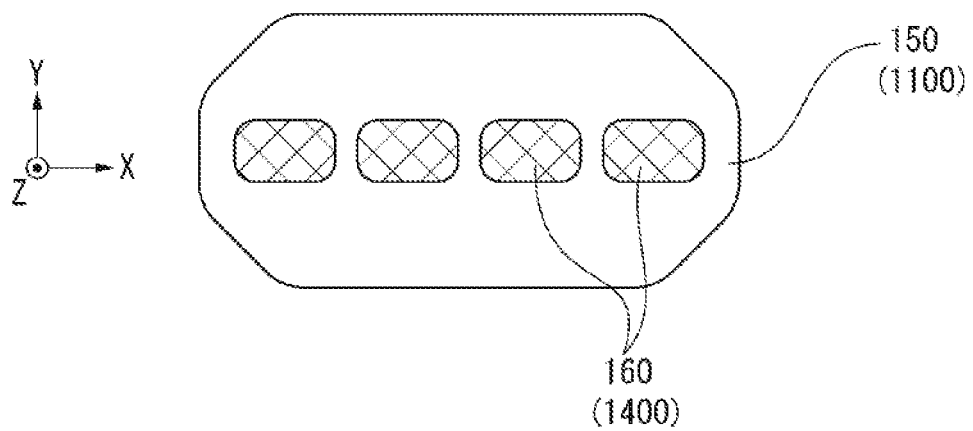
FIGS. 10A and 10B are schematic diagrams illustrating another example of the disposition of the head units disposed in the head base.
Figure 10B:
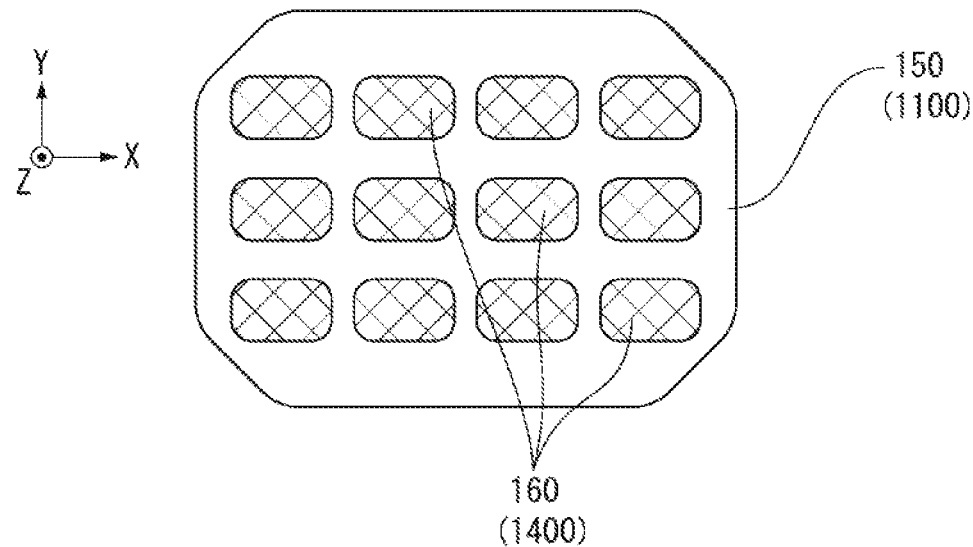

The number and arrangement of the head units 160 disposed in the head base 150 included in the forming apparatus 1000 according to the above-described first embodiment or the number and arrangement of the head units 1400 disposed in the head base 1100 included in the forming apparatus 2000 according to the second embodiment are not limited to the above-described number and arrangement illustrated in FIGS. 2A and 2B or FIG. 5. FIGS. 10A and 10B schematically illustrate examples of other dispositions of the head units 160 or 1400 disposed in the head base 150 or 1100.

FIG. 10A illustrates a form in which the plurality of head units 160 or 1400 are arranged in a line in the X axis direction in the head base 150 or 1100. FIG. 10B illustrates a form in which the head units 160 or 1400 are arranged in a lattice form in the head base 150 or 1100. The number of head units arranged in either example is not limited to the illustrated example.

Third Embodiment

Figure 11:
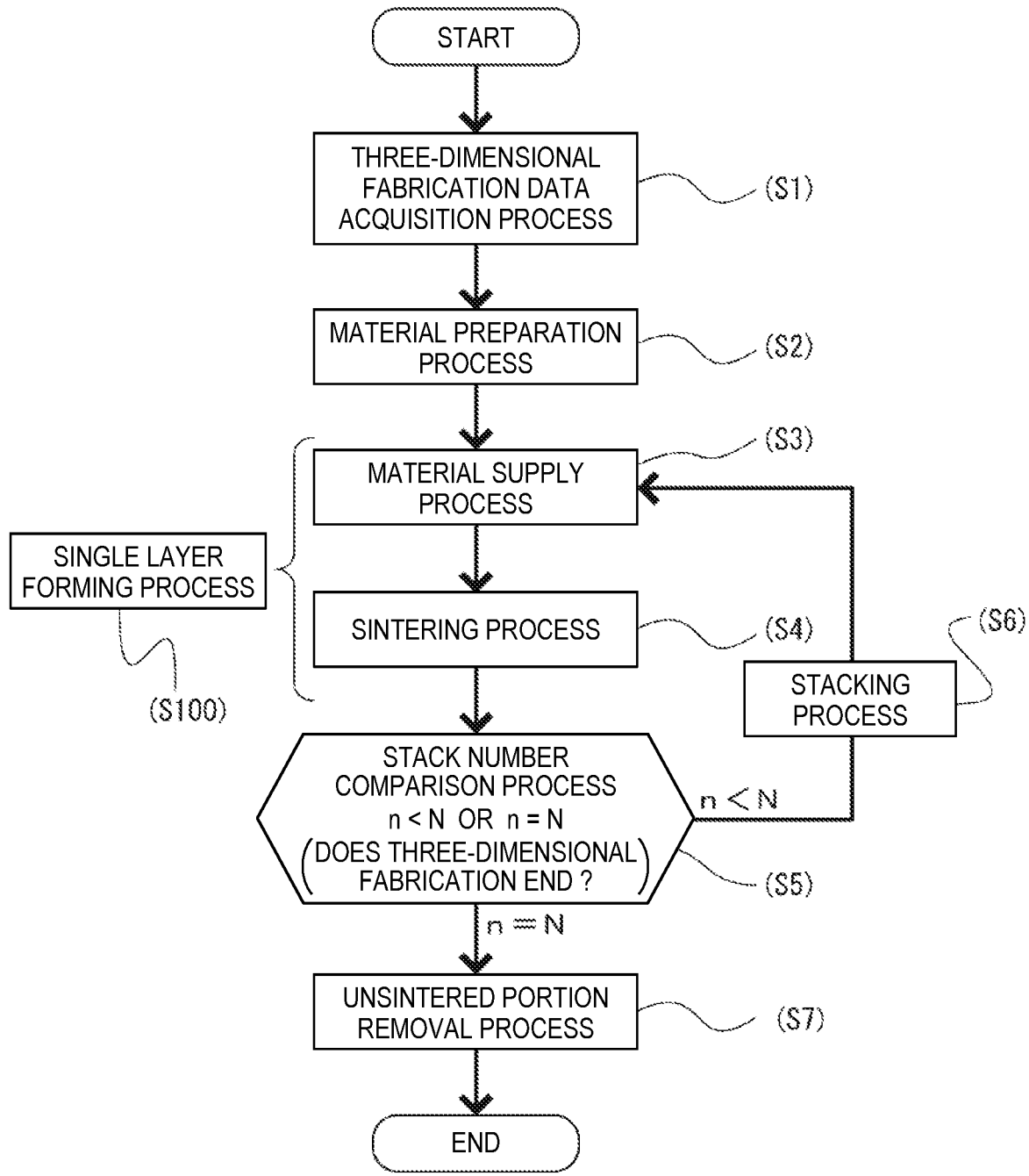
FIG. 11 is a flowchart illustrating a three-dimensional forming method according to a third embodiment.
Figure 12:
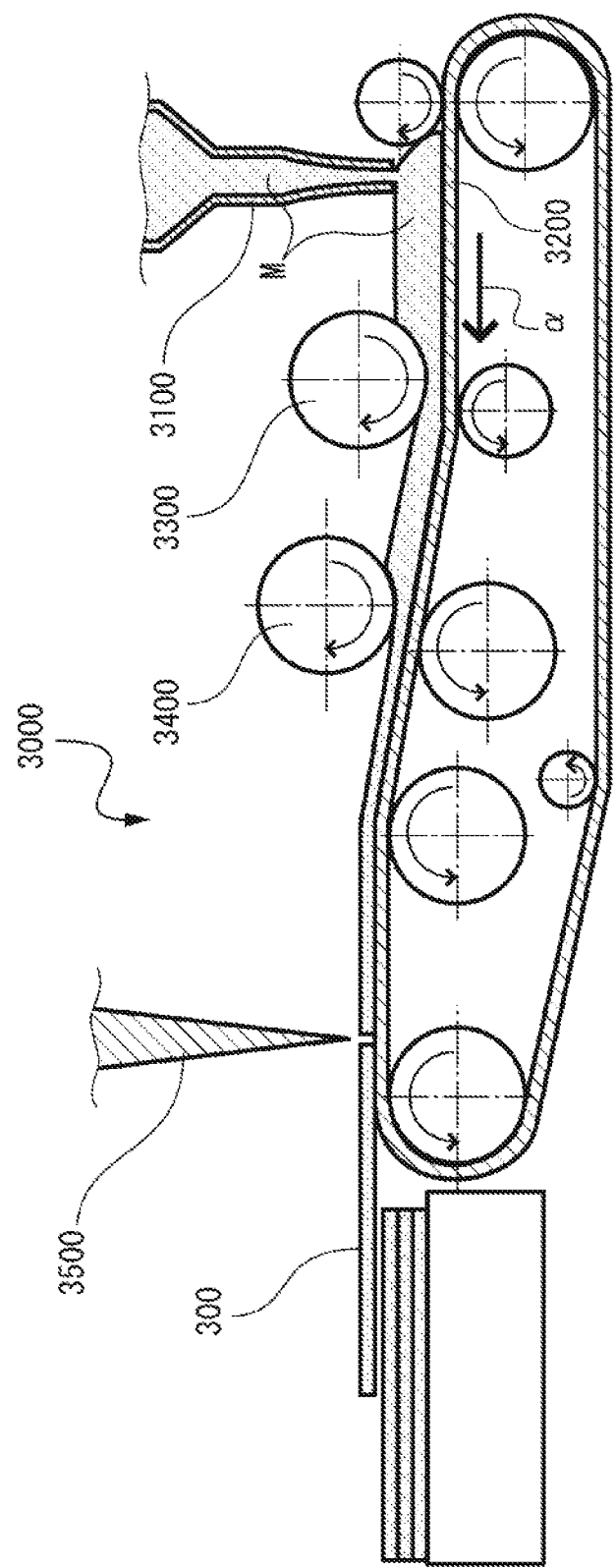
FIG. 12 is a schematic diagram illustrating the configuration of a green sheet forming apparatus according to the third embodiment.
Figure 15E:
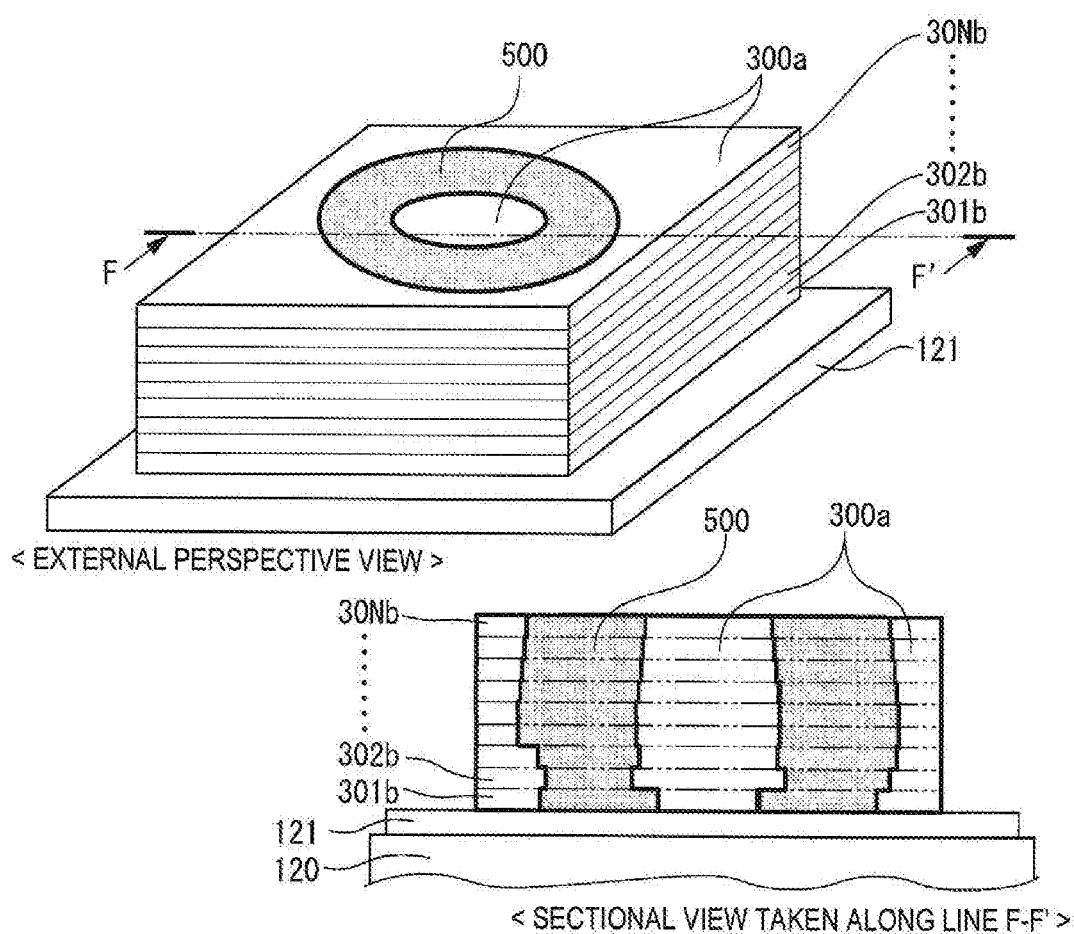
FIGS. 15E and 15F are external perspective views illustrating steps of the three-dimensional forming method according to the third embodiment and are schematic sectional views taken along the line F-F' illustrating in the external perspective views.
Figure 15F:
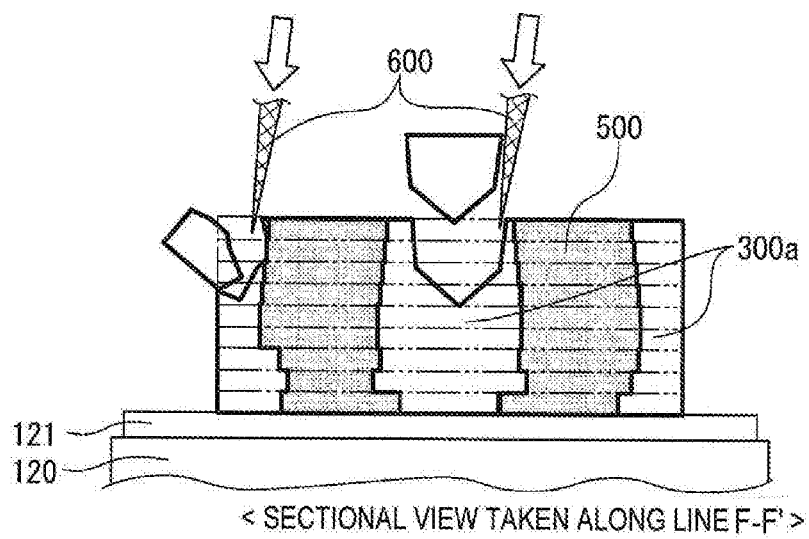

A three-dimensional forming method of forming a three-dimensional fabricated object using the three-dimensional forming apparatus 1000 according to the first embodiment will be described according to a third embodiment. FIG. 11 is a flowchart illustrating the three-dimensional forming method according to the third embodiment. FIG. 12 is a schematic diagram illustrating the configuration of a green sheet forming apparatus that forms the green sheet 300. FIGS. 13A, 13B, 14A, and 14B are schematic plan views and sectional views illustrating steps of the three-dimensional forming method according to the embodiment. FIGS. 15E and 15F are external perspective views and schematic sectional views illustrating steps of the three-dimensional forming method according to the embodiment.

Three-Dimensional Fabrication Data Acquisition Process

As illustrated in FIG. 11, in the three-dimensional forming method according to the embodiment, a three-dimensional fabrication data acquisition process (S1) of acquiring three-dimensional fabrication data of the three-dimensional fabricated object from, for example, a personal computer (not illustrated) by the control unit 400 (see FIG. 1) is performed. As the three-dimensional fabrication data acquired in the three-dimensional fabrication data acquisition process (S1), control data is transmitted from the control unit 400 to the stage controller 410, the material supply device controller 420, and the laser controller 430, and then the process proceeds to a material preparation process.

Material Preparation Process

In a material preparation process (S2), a predetermined number of green sheets 300 are placed on the supply table 220 included in the material supply device 200. The green sheets 300 are formed by a green sheet forming apparatus 3000 or the like of the green sheets 300, as a schematic configuration is exemplified in FIG. 12.

As illustrated in FIG. 12, the green sheet forming device 3000 includes a raw material supply unit 3100 that supplies a material M and a transfer belt 3200 that receives the material M discharged from the raw material supply unit 3100 and transfers the material M. A mixture in which a metal powder formed with a size equal to or less than 30 μm and a binder are kneaded and formed in a paste form is used as the material M. As the metal powder, for example, an alloy such as a cobalt-based alloy, maraging steel, stainless steel, a titanium-based alloy, a nickel-based alloy, a magnesium alloy, or a copper-based alloy, or a metal such as iron, titanium, nickel, or copper can be used. As the binder, a thermoplastic resin or a thermoplastic water-soluble resin can be used. As the thermoplastic resin, for example, polylactic acid (PLA), polypropylene (PP), polyphenylene sulfide (PPS), polyamide (PA), ABS, or polyether ether ketone (PEEK) is used. As the thermoplastic water-soluble resin, for example, polyvinyl alcohol (PVA) or polyvinyle butyral (PVB) is used.

The material M in which the above-described metal powder and binder and a solvent for viscosity adjustment are added and kneaded is input to the raw material supply unit 3100, and a predetermined amount of material M is sequentially discharged to the transfer belt 3200 driven in an illustrated arrow a direction. With the movement of the transfer belt 3200 in the a direction, the thickness of the material M is equalized by an equalizing roll 3300, the material M passes through a subsequent pressurization roller 3400 so that the material M has a predetermined thickness for the green sheet 300. Then, the material M is cut out in a predetermined length by a cutting unit 3500 to obtain the green sheet 300.

Material Supply Process

When the predetermined number of green sheets 300 are placed on the supply table 220 of the material supply device 200 in the material preparation process (S2), a material supply process (S3) starts. In the material supply process (S3), the material supply device controller 420 generates a driving signal of the transfer device 230 based on a control signal from the control unit 400 and drives the transfer device 230.

First, the sheet holding unit 230a is moved up to a predetermined position, and the uppermost sheet of the green sheets 300 stacked on the supply table 220 is adsorbed and held by the sheet adsorption unit 230c. The sheet holding unit 230a is moved to the sample plate 121 of the sintering device 100 while holding the green sheet 300, the green sheet 300 is detached and separated from the sheet adsorption unit 230c, and the green sheet 300 is placed on the sample plate 121. After the green sheet 300 is placed and separated, the sheet holding unit 230a returns to a standby position of the material supply device 200. Hereinafter, the green sheet 300 placed as a first layer will be described as a first layer green sheet 301.

Sintering Process

The process proceeds to a sintering process (S4) in which the lasers L are radiated from the laser radiation units 140 included in the plurality of head units 160 held in the head base 150 to the green sheet 301 of the first layer placed on the sample plate 121 in the material supply process (S3).

The sintering in the sintering process (S4) is a process of removing the binder from the state in which the metal powder and the binder included in the green sheet 300 are included, bonding the metal powder, and forming a metal fabricated object.

In FIGS. 13A, 13B, and 14A, a method of forming a sintered portion 311 of the green sheet 301 of the first layer in the sintering process (S3) is illustrated. In this example, a method of forming the partial fabricated object 501 of the first layer in a circular state included in the three-dimensional fabricated object 500 is exemplified. In FIGS. 13A to 14B, plan views are illustrated on the upper sides and sectional views taken along the line F-F' illustrated in the plan views on the lower sides.

As illustrated in FIG. 13A, while moving the head base 150 in the Y direction relative to the green sheet 301 of the first layer placed on the sample plate 121 included on the stage 120, the lasers L are radiated toward the green sheet 301 from the laser radiation units 140 included in the head units 160 (not illustrated in the drawing) disposed in the head base 150.

When the relative movement of the head base 150 by a predetermined amount ends, sintered portions 310 are formed as a aggregate of the sintered portions corresponding to the sintered portions 310a, 310b, 310c, 310d, 310e, and 310f formed at the time of the radiation from the laser radiation units 140, as described in FIG. 3D, so that the first sintered portion 311 included in the partial fabricated object 501 is formed. As illustrated in FIG. 13B, the head base 150 forms the aggregate of the sintered portions corresponding to the sintered portions 310a, 310b, 310c, 310d, 310e, and 310f formed at the time of the radiation from the laser radiation units 140, as described in FIG. 3D, to be continuous with the sintered portions 310 illustrated in FIG. 13A, so that a sintered portion 312 is formed and thus a sintered portion 310 joined to the sintered portion 311 is formed.

As illustrated in FIG. 13B, the head base 150 forms the aggregate of the sintered portions corresponding to the sintered portions 310a, 310b, 310c, 310d, 310e, and 310f formed at the time of the radiation from the laser radiation units 140, as described in FIG. 3D, to be continuous with the sintered portions 310 illustrated in FIG. 13A a predetermined number of times repeatedly in sequence. Then, as illustrated in FIG. 14C, an i-th sintered portion 31i in which the sintered portion 310 is formed until the shape of the partial fabricated object 501 is formed, and thus the partial fabricated object 501 and a portion excluding the partial fabricated object 501, that is, an unsintered portion 301a, are formed in the green sheet 301 of the first layer.

In this way, the sintered partial fabricated object 501 and the unsintered portion 301a are formed in the sintering process (S4), so that a first layer 301b is formed as a first single layer. The above-described series of processes from the material supply process (S3) and the sintering process (S4) is a single layer forming process (S100). Then, the sintering process (S4) ends, that is, the single layer forming process (S100) ends and the process proceeds to a subsequent stack number comparison process.

Stack Number Comparison Process

When the first layer 301b including the partial fabricated object 501 which is the first layer, the unsintered portion 301a is formed in the single layer forming process (S100), the process proceeds to a stack number comparison process (S5) of performing comparison with fabrication data obtained in the three-dimensional fabrication data acquisition process (S1). In the stack number comparison process (S5), a stack number N of green sheets 300 in which partial fabricated objects are formed and which are necessary to form the three-dimensional fabricated object 500 is compared to a stack number n of green sheets 300 stacked up to the single layer forming process (S100) immediately before the stack number comparison process (S5). When n<N is determined in the stack number comparison process (S5), the process proceeds to a stacking process of performing the single layer forming process (S100) again.

Stacking Process

A stacking process (S6) is an instruction process of performing the single layer forming process (S100) again when n<N is determined in the stack number comparison process (S5). The material supply process (S3) which is a start process of the single layer forming process (S100) is performed.

As illustrated in FIG. 14D, the green sheet 300 is supplied to be placed on the upper portion of the first layer 301b through the stacking process (S6) and becomes a green sheet 302 of a second layer. Then, as illustrated in FIGS. 13A, 13B, and FIG. 14D, the sintering process (S5) is performed on the green sheet 302 of the second layer, so that a second layer 302b can be obtained as a second single layer in which a partial fabricated object 502 of the second layer and a unsintered portion (not illustrated) are formed. Thereafter, the process proceeds to the stack number comparison process (S6). When n<N is determined, the stacking process (S6) starts again. The stacking process (S6) and the single layer forming process (S100) are repeated until n=N is determined in the stack number comparison process (S5).

As illustrated in FIG. 15E, when the predetermined stack number N is stacked, the three-dimensional fabricated object 500 is formed on the sample plate 121. Unsintered portions 300a stacked to be formed from the first layer 301b to an N-th layer 30Nb are also formed on the sample plate 121. Then, when n=N is determined in the stack number comparison process (S5), the process proceeds to an unsintered portion removal process.

Unsintered Portion Removal Process

An unsintered portion removal process (S7) is a process of removing portions excluding the three-dimensional fabricated object 500, that is, the unsintered portions 300a. As the method of removing the unsintered portions 300a, for example, a mechanical removal method or a method of dissolving the binder including the unsintered portions 300a using a solvent and removing the remaining metal powder can be applied. In the embodiment, the mechanical removal method will be described as an example.

As illustrated in FIG. 15F, in the unsintered portion removal process (S7), the unsintered portions 300a are removed on the sample plate 121 by striking the unsintered portions 300a with a removal tool 600 with a wedge-shaped tip end and breaking the unsintered portions 300a. Then, the three-dimensional fabricated object 500 remains on the sample plate 121 and is extracted. In the embodiment, the case in which the unsintered portion removal process (S7) is performed on the sample plate 121 has been described, but the unsintered portion removal process may be performed on a separately provided work stand.

In the three-dimensional forming method for the three-dimensional fabricated object 500 according to the above-described third embodiment, in the sintering process (S5) of the single layer forming process (S100), the sintered portions 310 can be formed in a broad region merely moving the head base 150 relative to the stage 120 in one direction, in this example, the Y axis direction since the plurality of head units 160 including the laser radiation units 140 are included in the head base 150 included in the sintering device 100. Thus, it is possible to obtain the three-dimensional forming method with high productivity.

Fourth Embodiment

Figure 16:
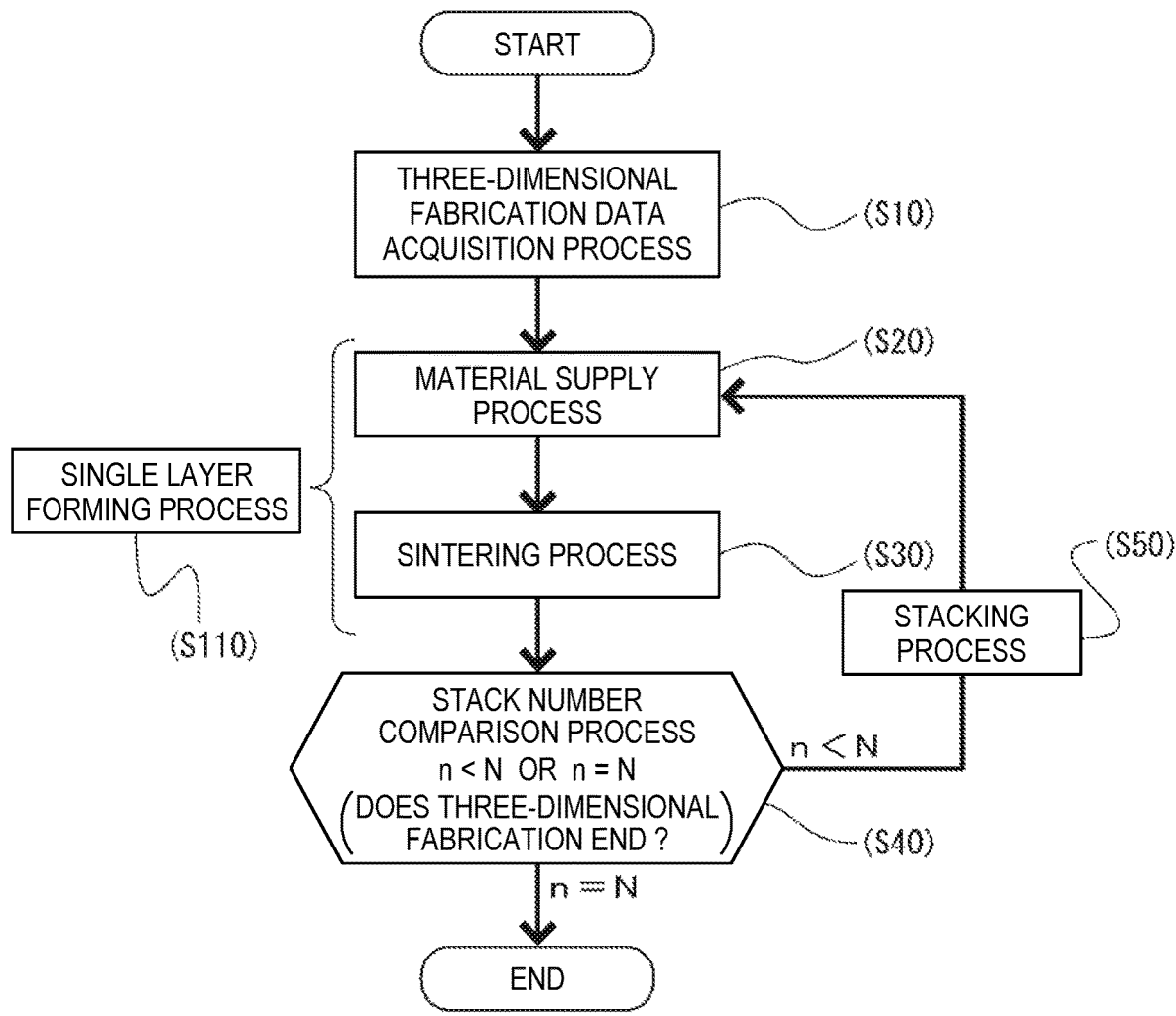
FIG. 16 is a flowchart illustrating a three-dimensional forming method according to a fourth embodiment.

A three-dimensional forming method of forming a three-dimensional fabricated object using the three-dimensional forming apparatus 2000 according to the second embodiment will be described according to a fourth embodiment. FIG. 16 is a flowchart illustrating the three-dimensional forming method according to the fourth embodiment. FIGS. 17A, 17B, 18A, and 18B are diagrams illustrating a three-dimensional forming process according to the embodiment and schematic plan views on the upper sides and schematic sectional views taken along the line G-G' illustrating the schematic plan views on the lower sides.

Three-Dimensional Fabrication Data Acquisition Process

As illustrated in FIG. 16, in the three-dimensional forming method according to the embodiment, a three-dimensional fabrication data acquisition process (S10) of acquiring three-dimensional fabrication data of the three-dimensional fabricated object 500 from, for example, a personal computer (not illustrated) by the control unit 400 (see FIGS. 4A and 4B) is performed. As the three-dimensional fabrication data acquired in the three-dimensional fabrication data acquisition process (S10), control data is transmitted from the control unit 400 to the stage controller 410, the material supply controller 1500, and the laser controller 430, and then the process proceeds to a single layer forming process.

Single Layer Forming Process

In a single layer forming process (S110), a material supply process (S20) and a sintering process (S30) are performed over a region in which the partial fabricated object 501 of the first layer is formed. In the material supply process (S20), the materials M are ejected in the liquid droplet form toward the sample plate 121 from the material ejection units 1230 held in the plurality of head units 1400 included in the head base 1100, and thus the materials M are landed to a predetermined formation region on the sample plate 121.

When the materials M are landed to be formed on the sample plate 121 in the material supply process (S20), the process proceeds to the sintering process (S30). In the sintering process (S30), the lasers L are radiated from the laser radiation units 1300 held by the head units 1400 to the materials M supplied in the liquid droplet form in the material supply process (S20), and thus the materials M are baked and sintered so that sintered portions 50 are formed.

As described in FIG. 9, the head units 1401, 1402, 1403, 1404, 1405, 1406, 1407, and 1408 form the aggregate of the sintered portions corresponding to the sintered portions 50a, 50b, 50c, 50d, 50e, 50f, 50g, and 50h by moving the head base 1100 in the Y axis direction relative to the stage 120 on which the sample plate 121 is placed while repeating the material supply process (S20) and the sintering process (S30) in a predetermined region, and thus the initial sintered portions 50 of the partial fabricated object 501 are formed as a sintered portion 511.

Further, as illustrated in FIG. 17B, the head base 1100 is moved in the X axis direction relative to the stage 120 at a position at which the sintered portions corresponding to the sintered portions 50a, 50b, 50c, 50d, 50e, 50f, 50g, and 50h are formed to be continuous with the sintered portion 511 illustrated in FIG. 17A. The head units 1401, 1402, 1403, 1404, 1405, 1406, 1407, and 1408 form the aggregate of the sintered portions corresponding to the sintered portions 50a, 50b, 50c, 50d, 50e, 50f, 50g, and 50h by moving the head base 1100 in the Y axis direction relative to the stage 120 on which the sample plate 121 is placed while repeating the material supply process (S20) and the sintering process (S30) in a predetermined region, and thus the sintered portions 50 are formed as a sintered portion 512 continuous with the sintered portion 511. That is, the sintered portions 50 are formed by the sintered portions 511 and 512.

As illustrated in FIG. 17B described above, sintered portions are sequentially formed to be continuous with the sintered portion 512 so that the sintered portion 512 is formed to be continuous with the earlier formed sintered portion 511. As illustrated in FIG. 18C, an i-th sintered portion 51i in which the sintered portion 50 is formed until the shape of the partial fabricated object 501 is formed, and thus the partial fabricated object 501 of the first layer of the three-dimensional fabricated object 500 is formed on the sample plate 121.

As described above, in the embodiment, when the partial fabricated object 501 of the first layer is formed repeating the material supply process (S20) and the sintering process (S30) while moving the head base 1100 in the Y axis direction and the X axis direction relative to the sample plate 121, the single layer forming process (S110) ends. Then, the process proceeds to a subsequent stack number comparison process.

Stack Number Comparison Process

When the partial fabricated object 501 which is the first layer is formed as a first single layer in the single layer forming process (S110), the process proceeds to a stack number comparison process (S40) of performing comparison with fabrication data obtained in the three-dimensional fabrication data acquisition process (S10). In the stack number comparison process (S40), a stack number N of partial fabricated objects included in the three-dimensional fabricated object 500 is compared to a stack number n of partial fabricated objects stacked up to the single layer forming process (S110) immediately before the stack number comparison process (S40). When n<N is determined in the stack number comparison process (S40), the process proceeds to a stacking process of performing the single layer forming process (S110) again.

In the stack number comparison process (S40) after the partial fabricated object 501 of the first layer is formed as the first single layer illustrated in FIG. 18C, when the stack number n=1 and the three-dimensional fabricated object 500 includes the stack number N of partial fabricated objects >1, n<N is determined and the process proceeds to s stacking process.

Stacking Process

A stacking process (S50) is an instruction process of performing the single layer forming process (S110) again when n<N is determined in the stack number comparison process (S40). When the process proceeds to the single layer forming process (S110), as illustrated in FIG. 18D, the head base 1100 and the stage 120 are driven to start forming the partial fabricated object 502 on the upper portion of the partial fabricated object 501 of the first layer in the stacking process (S50) at a position at which the material supply process (S20) and the sintering process (S30) start based on the three-dimensional fabrication data corresponding to the partial fabricated object 502 of the second layer which is the second single layer.

When the forming of the partial fabricated object 502 of the second layer ends, the process proceeds to the stack number comparison process (S40) again. Until n=N, the process proceeds to the stacking process (S50) and the single layer forming process (S110) is repeated to form the three-dimensional fabricated object 500.

In the three-dimensional forming method for the three-dimensional fabricated object 500 according to the above-described fourth embodiment, in the material supply process (S20) and the sintering process (S30) of the single layer forming process (S110), the sintered portions 50 can be formed in a broad region merely moving the head base 1100 relative to the stage 120 in one direction, in this example, the Y axis direction since the plurality of head units 1400 including the material ejection units 1230 and the laser radiation units 1300 are included in the head base 1100 included in the forming apparatus 2000. Thus, it is possible to obtain the three-dimensional forming method with high productivity.

Since the plurality of different kinds of sintered materials are accommodated in the material accommodation units 1210a in the material supply unit 1210 included in the forming apparatus 2000 illustrated in FIGS. 4A and 4B, the three-dimensional fabricated object 500 formed of different kinds of materials can be easily obtained.

Fifth Embodiment

A three-dimensional forming method according to a fifth embodiment will be described. In the three-dimensional forming method according to the above-described fourth embodiment, when the three-dimensional fabricated object has an overhang, there is no partial fabricated object of the lower layer to which the materials M ejected from the material ejection units 1230 are to be landed in the overhang, and thus the materials M are not formed in the material supply process (S20) of the above-described single layer forming process (S110) (see FIG. 18D). When a region in which the partial fabricated object 501 of the first layer which is the partial fabricated object of the lower layer illustrated in FIG. 18D is not disposed in the fabrication region of the partial fabricated object 502 of the second layer is present, there is a concern of the partial fabricated object 502 being deformed and hanging down in the gravity direction in the portion. That is, the material M before the sintering is a material in a slurry state (or a paste form) obtained by kneading an elementary powder of a metal which is the raw material, for example, an alloy of stainless steel and titanium, or a mixed powder of stainless steel and copper (Cu) which are difficult to alloy, an alloy of stainless and titanium, or a titanium alloy and cobalt (Co) or chrome (Cr) with a solvent and a thickener.

Accordingly, a method of forming a three-dimensional fabricated object without deforming an overhang by the three-dimensional forming method according to the fifth embodiment will be described. The same reference numerals are given to the same processes as those of the three-dimensional forming method according to the fourth embodiment, and the description thereof will be omitted. To facilitate the description, as illustrated in the external plan view of FIG. 19A and the sectional view of FIG. 19B taken along the line K-K' illustrated in FIG. 19A, a three-dimensional fabricated object 700 with a simple shape will be exemplified to describe the three-dimensional forming method according to the fifth embodiment, but the invention is not limited to this shape. The invention can be applied when a fabricated object has a so-called overhang.

Figure 19A:
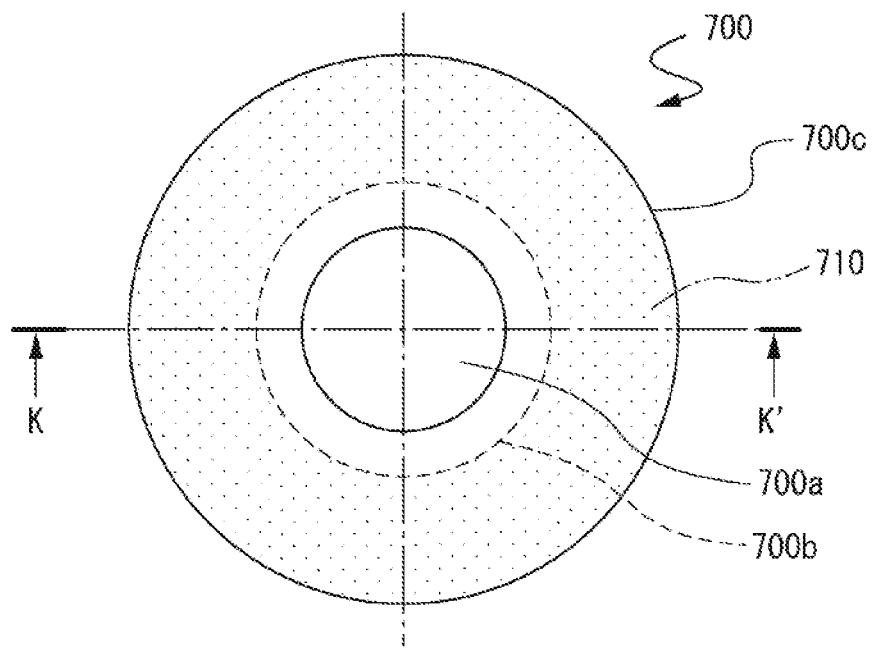
FIG. 19A is a plan view illustrating a three-dimensional fabricated object according to a fifth embodiment and FIG. 19B is a sectional view taken along the line K-K' illustrated in FIG. 19A.
Figure 19B:
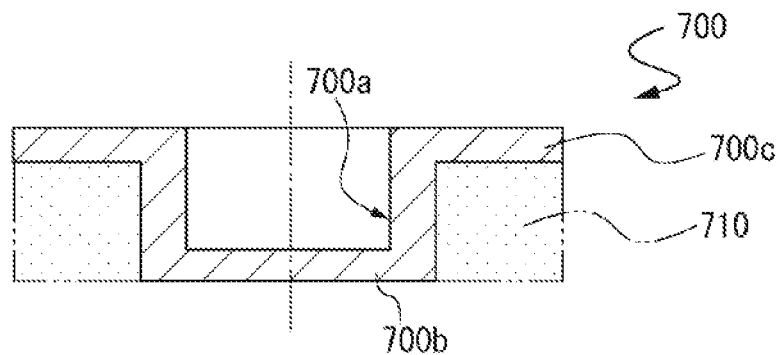

As illustrated in FIGS. 19A and 19B, the three-dimensional fabricated object 700 includes a flange portion 700c which is an overhang extending to the outer side of a base portion 700b in an concave opening-side end of the columnar base portion 700b including a concave portion 700a. To form the three-dimensional fabricated object 700 based on the three-dimensional forming method according to the fifth embodiment, fabrication data for which support portions 710 to be removed in a forming process reach the bottom portion of the base portion 700b in the illustrated lower direction of the flange portion 700c is added to three-dimensional fabrication data of the three-dimensional fabricated object 700 for generation.

Figure 20:
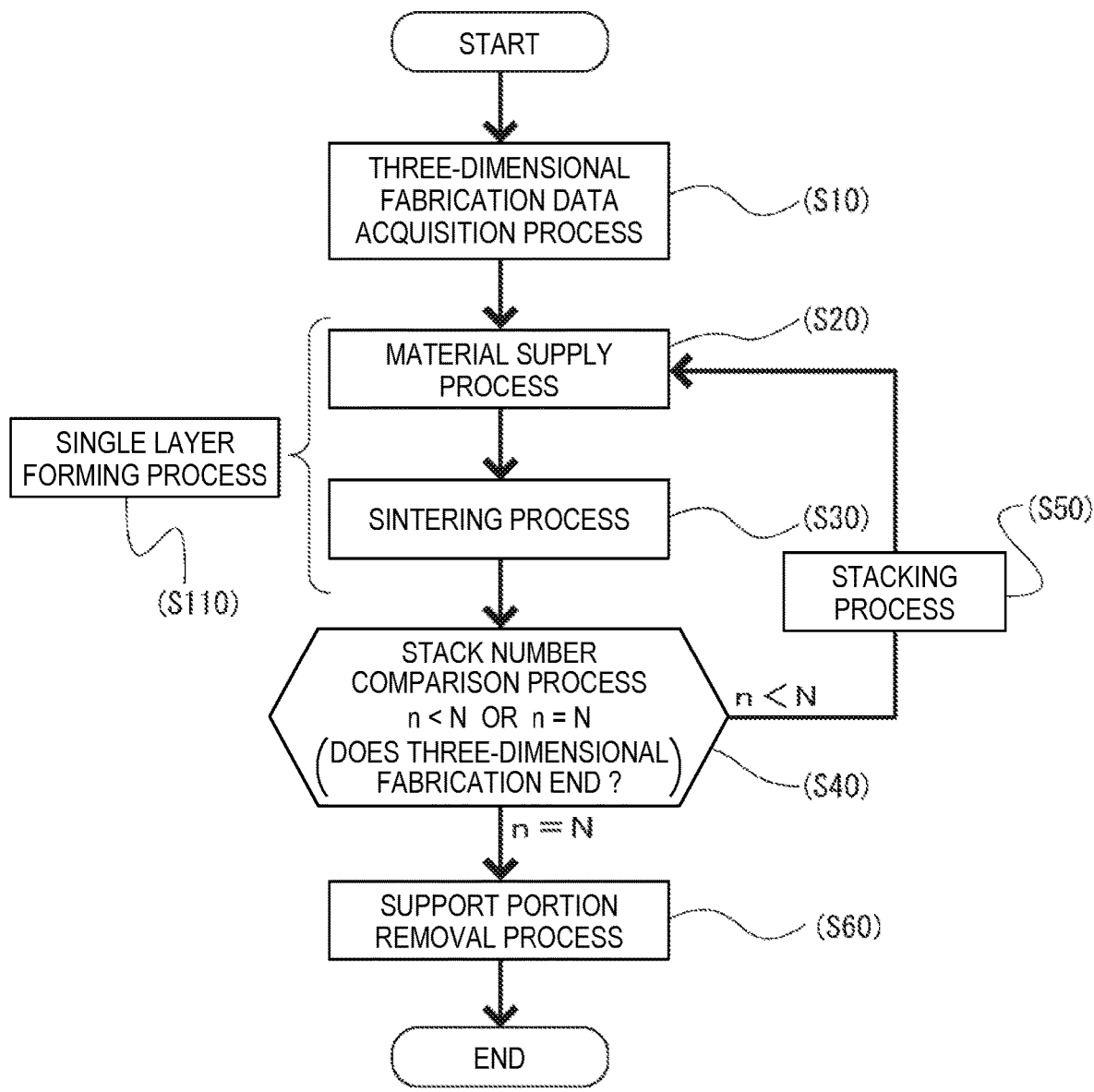
FIG. 20 is a flowchart illustrating a three-dimensional forming method according to the fifth embodiment.

FIG. 20 is a flowchart illustrating a method of forming the three-dimensional fabricated object 700 illustrated in FIGS. 19A and 19B. FIGS. 21A to 21D illustrate a method of forming the three-dimensional fabricated object 700 in the flowchart illustrated in FIG. 20, and partial sectional views and external plan views are illustrated on the left side and the right side of the drawings, respectively. In the three-dimensional fabricated object 700 according to the embodiment, an example in which four layers are stacked and formed will be described, but the invention is not limited thereto.

As illustrated in FIG. 21A, first, a partial fabricated object 701 which is a first layer is formed on the sample plate 121 (not illustrated) by the three-dimensional forming method according to the fourth embodiment. In the process of forming the partial fabricated object 701, partial support portions 711 of the first layer are also formed. The sintering process (S30) of the single layer forming process (S110) described with reference to FIGS. 17A to 18B is not performed on the partial support portions 711, and the single layer forming process (S110) is performed with the material M remaining, that is, unsintered or unmelted.

Subsequently, the single layer forming process (S110) is repeated to form partial fabricated objects 702 and 703 which are second and third layers, as illustrated in FIG. 21B. Then, in a process of forming the partial fabricated objects 702 and 703, partial support portions 712 and 713 of the second and third layers are also formed. As in the partial support portion 711, the sintering process (S30) of the single layer forming process (S110) is not performed on the partial support portions 712 and 713, and the single layer forming process (S110) is performed with the material M remaining, that is, unsintered or unmelted, so that the support portions 710 are formed by the partial support portions 711, 712, and 713.

Next, as illustrated in FIG. 21C, a partial fabricated object 704 of a fourth layer formed in the flange portion 700c is formed. The partial fabricated object 704 is formed to be supported by ends 710a of the support portions 710 formed by the partial support portions 711, 712, and 713. By forming the partial fabricated object 704 in this way, the ends 710a are formed as surfaces to which the material M (see FIG. 18D) is landed, so that the partial fabricated object 704 of the fourth layer which becomes the flange portion 700c can be formed accurately.

Then, as illustrated in FIG. 21D, when the three-dimensional fabricated object 700 is fabricated, the support portions 710 are removed from the three-dimensional fabricated object 700 in the support portion removal process (S60). Since the support portions 710 are formed of an unbaked material, the support portions 710 can be physically cut by, for example, a sharp-edged tool 800 which is a removal unit for the support portions 710 in a support portion removal process (S60), as illustrated in FIG. 21D. Alternatively, the three-dimensional fabricated object 700 may be removed by performing immersing in a solvent and dissolving the thickener included in the material.

As described above, when the three-dimensional fabricated object 700 including the flange portion 700c which is the overhang is formed, it is possible to prevent the flange portion 700c from being deformed in the gravity direction by forming the support portions 710 supporting the flange portion 700c in conjunction with the forming of the three-dimensional fabricated object 700. The support portions 710 illustrated in FIGS. 21A and 21D are not limited to the form in which the illustrated flange portion 700c is supported (sustained) on the entire surface, but the shapes, sizes, and the like of the support portions are set according to the shape of the fabricated object, a material composition, or the like.

The specific configurations in the embodiments of the invention can be appropriately changed to other devices or methods within the scope of the invention in which the object of the invention can be achieved.

The entire disclosure of Japanese patent No. 2015-106177, filed May 26, 2015 is expressly incorporated by reference herein.

What is claimed is:

1. A three-dimensional forming apparatus comprising:
    a stage;
    a material supply unit that supplies the stage with a sheet of material formed by kneading a mixture including at least metal powder and a binder;
    a plurality of head units, each of which including an energy radiation unit supplying energy and configured to simultaneously sinter a corresponding area of the sheet of material supplied onto the stage, wherein at least one of the corresponding areas joins at least one of the other corresponding areas when the corresponding areas are simultaneously sintered;
    a head base that holds the plurality of the head units; and
    a driving unit that is capable of three-dimensionally moving the head base relative to the stage.

2. The three-dimensional forming apparatus according to claim 1, wherein the energy is a laser.

3. A three-dimensional forming method comprising:
    supplying a stage with a sheet of material formed by kneading a mixture of at least metal powder and a binder;
    forming a single layer by moving a head base that holds a plurality of head units, each of which including an energy radiation unit that supplies energy capable of sintering the sheet of material relative to the stage, supplying the energy to a corresponding area of the sheet of material, and sintering the corresponding area of the sheet of material, wherein at least one of the corresponding areas joins at least one of the other corresponding areas when the corresponding areas are simultaneously sintered; and
    forming a second layer in the forming of the single layer by stacking the second layer on a first single layer formed in the forming of the single layer,
    wherein the forming of the second layer is repeated a predetermined number of times.

4. The three-dimensional forming method according to claim 3,
    wherein the energy is a laser.

5. The three-dimensional forming apparatus of claim 1, wherein each of the corresponding areas of the sheet of material has a predetermined sintering width, and at least two of the plurality of head units are maintained at a predetermined distance in a width direction, and the predetermined distance is substantially same as the predetermined sintering width in the width direction.

6. The three-dimensional forming method of claim 3, wherein each of the corresponding areas of the sheet of material has a predetermined sintering width, and at least two of the plurality of head units are maintained at a predetermined distance in a width direction, and the predetermined distance is substantially same as the predetermined sintering width in the width direction.

* * * * *